(12) United States Patent
Jablovski et al.

(10) Patent No.: US 12,202,502 B2
(45) Date of Patent: Jan. 21, 2025

(54) APPARATUS FOR DISPLAYING INFORMATION ON A VEHICLE

(71) Applicant: uze! Mobility GmbH, Bremen (DE)

(72) Inventors: Alexander Jablovski, Bremen (DE); Sebastian Leimbrink, Bremen (DE); Jan Schwark, Bremen (DE); Paris Leners, Bremen (DE)

(73) Assignee: uze! Mobility GmbH, Bremen (DE)

( * ) Notice: Subject to any disclaimer, the term of this patent is extended or adjusted under 35 U.S.C. 154(b) by 664 days.

(21) Appl. No.: 17/107,794

(22) Filed: Nov. 30, 2020

(65) Prior Publication Data
US 2022/0169272 A1  Jun. 2, 2022

(51) Int. Cl.
*B60W 50/14* (2020.01)
*B60R 11/02* (2006.01)
(Continued)

(52) U.S. Cl.
CPC ......... *B60W 50/14* (2013.01); *B60R 11/0235* (2013.01); *G06V 20/56* (2022.01);
(Continued)

(58) Field of Classification Search
CPC ............ B60W 50/14; B60W 2050/146; B60R 11/0235; B60R 2011/004; G06V 20/56;
(Continued)

(56) References Cited

U.S. PATENT DOCUMENTS

| | | | |
|---|---|---|---|
| 2009/0172983 A1* | 7/2009 | Curtis | G09F 21/04 40/591 |
| 2012/0251072 A1* | 10/2012 | Cope | G09F 9/3026 386/230 |

(Continued)

FOREIGN PATENT DOCUMENTS

| | | |
|---|---|---|
| CN | 108597128 A | 9/2018 |
| DE | 10130569 A1 | 1/2002 |
| DE | 102016109619 A1 | 11/2017 |
| DE | 102017213283 A1 | 2/2019 |

(Continued)

OTHER PUBLICATIONS

Dorri, A., "BlockChain: A Distributed Solution to Automotive Security and Privacy," Automotive Networking and Applications, IEEE Communications Magazine, Dec. 2017, pp. 119-125.
(Continued)

*Primary Examiner* — Sath V Perungavoor
*Assistant Examiner* — Tyler B Edwards
(74) *Attorney, Agent, or Firm* — Ellen M. Bierman; Lowe Graham Jones PLLC

(57) ABSTRACT

The invention relates to an apparatus for displaying information on a vehicle. The apparatus comprises a display and a plate comprising a controller, a sensor and a communicator configured to communicate with an external server, wherein the controller is configured to control the apparatus such that sensor data from the sensor are sent to the external server and information received from the external server is shown on the display. A casing comprising a front wall includes the display, a back wall configured to be attached to the vehicle, and a frame, wherein the plate is arranged within the casing, wherein the frame comprises profile elements forming sidewalls of the casing and corner elements and wherein a respective corner element is detachably connected to two respective profile elements. This allows for a high adaptability of the apparatus.

23 Claims, 14 Drawing Sheets

(51) Int. Cl.
| | |
|---|---|
| *G06K 9/00* | (2022.01) |
| *G06V 20/56* | (2022.01) |
| *G09F 21/04* | (2006.01) |
| *B60R 11/00* | (2006.01) |
| *G09F 7/00* | (2006.01) |
| *G09F 7/18* | (2006.01) |

(52) U.S. Cl.
CPC ...... *G09F 21/048* (2013.01); *B60R 2011/004* (2013.01); *B60W 2050/146* (2013.01); *G09F 2007/005* (2013.01); *G09F 2007/1843* (2013.01)

(58) Field of Classification Search
CPC .............. G09F 21/048; G09F 2007/005; G09F 2007/1843; G09F 27/005
See application file for complete search history.

(56) References Cited

U.S. PATENT DOCUMENTS

| | | | | |
|---|---|---|---|---|
| 2012/0303458 | A1* | 11/2012 | Schuler, Jr. | ........ G06Q 30/0266 705/14.62 |
| 2012/0324771 | A1* | 12/2012 | Safavi | ..................... F21V 21/00 361/747 |
| 2018/0065881 | A1* | 3/2018 | Hashimoto | ............. B32B 17/06 |
| 2018/0091596 | A1 | 3/2018 | Alvarez et al. | |
| 2018/0186308 | A1 | 7/2018 | Batten et al. | |
| 2018/0272959 | A1* | 9/2018 | Hornsby | ............... G09F 21/042 |
| 2019/0213931 | A1* | 7/2019 | Brubaker | ............. B60Q 1/2607 |
| 2022/0208035 | A1* | 6/2022 | Weihmann | ............. G09G 3/348 |

FOREIGN PATENT DOCUMENTS

| | | |
|---|---|---|
| EP | 3048599 A1 | 7/2016 |
| WO | 2020081687 A1 | 4/2020 |

OTHER PUBLICATIONS

Madhusudan, A., "Applying Smart Contracts to Secure Car Sharing Systems," Thesis submitted for the degree of Master of Science in Artificial Intelligence, Option Big Data Analytics, Academic Year 2018-2019, 62 pages.

Madhusudan, A., Research and Biography, 2 pages, download date of Sep. 16, 2019.

International Search Report Issued in PCT/EP2019/053176 on Sep. 25, 2019.

International Search Report Issued in PCT/EP2019/058661 on Jul. 23, 2020.

* cited by examiner

APPARATUS FOR DISPLAYING INFORMATION ON A VEHICLE

TECHNICAL FIELD

The invention relates to an apparatus for displaying information on a vehicle. The invention relates further to a kit configured for assembling the apparatus and an assembling method for assembling the apparatus. The invention relates also to a system for displaying information on a vehicle, wherein the system comprises the apparatus.

BACKGROUND

It is known to equip a vehicle with an apparatus for displaying information on the vehicle such that the information can be shown to the surrounding. Such an apparatus can be used, for instance, for advertising purposes. The requirements for the apparatus for displaying information on the vehicle can thereby be quite different, wherein these requirements can refer to, for instance, a size of a display of the apparatus, a number of displays of the apparatus, a sensing of specific data like data about the surrounding, in particular, location data, temperature data, et cetera which might be used for controlling the apparatus, a kind of battery of the vehicle to which the apparatus should be connected, and so on. Adapting an apparatus for displaying information to a specific set of requirements is often impossible or disproportionally laborious.

BRIEF SUMMARY

It is an object of the present invention to provide an apparatus for displaying information on a vehicle, which can be more easily adapted to desired requirements. It is a further object of the present invention to provide a kit configured for assembling an apparatus for displaying information on a vehicle and an assembling method for assembling an apparatus for displaying information on a vehicle, which allow for an easy adaptation to desired requirements. It is also an object of the present invention to provide a system for displaying information on a vehicle, which comprises the apparatus.

In a first aspect of the present invention an apparatus for displaying information on a vehicle is presented, wherein the apparatus comprises:
a display configured to display the information,
a plate comprising a controller, a sensor and a communicator configured to communicate with an external server, wherein the controller is configured to control the apparatus such that sensor data from the sensor are sent to the external server and information received from the external server is shown on the display,
a casing comprising a front wall which is directed away from the vehicle when the apparatus is attached to the vehicle, a back wall which is directed towards the vehicle when the apparatus is attached to the vehicle and a frame forming sidewalls of the casing, wherein the front wall comprises the display, wherein the back wall is configured to be attached to the vehicle and wherein the plate is arranged within the casing, wherein the frame comprises frame elements, wherein the frame elements include straight profile elements forming sidewalls of the casing and corner elements forming corners of the casing, wherein a respective corner element is detachably connected to two respective straight profile elements by means of connection elements.

In a further aspect of the present invention a kit configured for assembling an apparatus as defined by claim 1 is presented, wherein the kit comprises:
a sensor,
a communicator configured to communicate with an external server,
a controller configured to control the apparatus to be assembled such that sensor data from the sensor are sent to an external server and information received from the external server is shown on a display which is configured to display the information,
a plate configured to be equipped with the controller, the sensor and the communicator,
a back wall which is directed towards the vehicle when the apparatus is attached to the vehicle and which is configured to form a back side of a casing of the apparatus,
a frame element for forming a frame, wherein the frame elements include profile elements configured to form sidewalls of the casing and corner elements configured to form corners of the casing,
wherein the back wall and the frame elements are configured to form together with the display the casing, wherein a front wall of the casing comprises the display.

In another aspect of the present invention an assembling method for assembling an apparatus as defined by claim 1 is presented, wherein the method comprises:
providing a kit configured for assembling an apparatus,
connecting the sensor to a sensor connector of the controller and connecting the controller to the communicator and a display which is configured to display information such that sensor data from the sensor are sendable to an external server and information received from the external server is showable on the display,
equipping the plate with the controller, the sensor and the communicator,
forming a casing by using the back wall, the display and the frame elements such that a) the back wall is directable towards a vehicle when the apparatus is attached to the vehicle and forms a back side of the casing, b) the frame elements form a frame, wherein the frame elements include profile elements forming sidewalls of the casing and corner elements forming corners of the casing, c) a front wall of the casing comprises the display and d) the plate with the controller, the sensor and the communicator is within the casing.

In a further aspect of the present invention a system for displaying information on a vehicle is presented, wherein the system comprises:
an apparatus configured to be attached to the vehicle as defined by any of claims 1 to 21, and
a server configured to receive sensor data from the apparatus and to send information to be displayed to the apparatus depending on the received sensor data.

It shall be understood that the apparatus of claim 1, the assembling method of claim 23, and the system of claim 22, have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION

Figure 1:
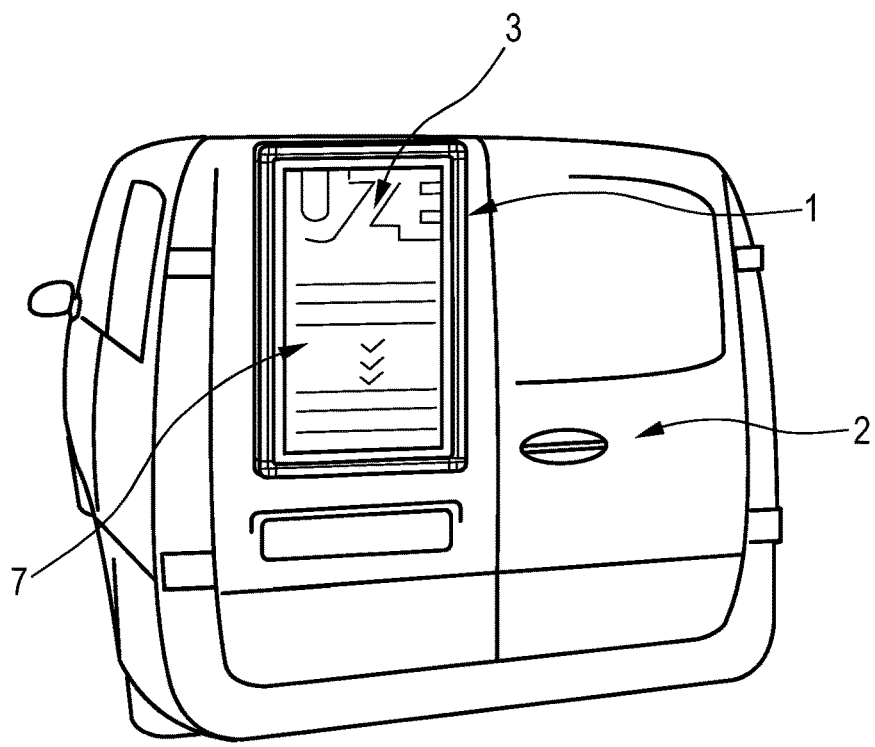
FIG. 1 shows schematically and exemplarily an embodiment of a vehicle with an apparatus for displaying information on a vehicle.

In a first aspect of the present invention an apparatus for displaying information on a vehicle is presented, wherein the apparatus comprises:
 a display configured to display the information,
 a plate comprising a controller, a sensor and a communicator configured to communicate with an external server, wherein the controller is configured to control the apparatus such that sensor data from the sensor are sent to the external server and information received from the external server is shown on the display,
 a casing comprising a front wall which is directed away from the vehicle when the apparatus is attached to the vehicle, a back wall which is directed towards the vehicle when the apparatus is attached to the vehicle and a frame forming sidewalls of the casing, wherein the front wall comprises the display, wherein the back wall is configured to be attached to the vehicle and wherein the plate is arranged within the casing, wherein the frame comprises frame elements, wherein the frame elements include straight profile elements forming sidewalls of the casing and corner elements forming corners of the casing, wherein a respective corner element is detachably connected to two respective straight profile elements by means of connection elements.

Thus, the frame can be provided as a modular frame such that, while assembling the apparatus or, for instance, replacing a current display by another display with other dimensions, the frame can easily be adapted to the outer dimensions of the display and/or a number of displays. In particular, since the frame comprises profile elements forming side walls of the casing and corner elements forming corners of the casing, the size of the frame can easily be adapted by, for instance, modifying the number of the profile elements forming a side wall of the frame. It is also possible that a profile element having a certain length is replaced by another profile element having another length for modifying the dimensions of the frame. Profile elements can be detachably connected to other profile elements. Profile elements with a short length can be attached to each other to form a profile element with a long length. The profile elements and the corner elements are detachably connected to each other such that they can easily be detached, in order to allow for a modification of the dimensions of the frame in a relatively simple and efficient way. In particular, the profile elements and the corner elements can be reusable. The connection elements can be screws. Additionally or alternatively, the connection between a profile element and a corner element can also be realized by another connection element like a clamping element or any other fastening element. Preferably, the profile elements are made of metal and the corner elements are made of a thermoplast like ABS.

In an embodiment, the sensor is attached to the plate by using an attachment element which is configured to allow a user to detach the sensor and to attach another sensor to the plate and wherein the sensor is connected to the controller via one of a plurality of sensor connectors of the controller, wherein the plurality of sensor connectors is configured to be connected to different types of sensors. The sensors can hence easily be added and removed in accordance with present requirements, thereby allowing for a further increased adaptability of the apparatus. In particular, the sensor can be detached from the plate and disconnected from the connector of the controller, and another sensor, which might be of another type, can be attached to the plate and connected to the controller by using a corresponding one of the plurality of connectors.

The plate, which is preferentially a metal plate, can comprise one or more sensors, wherein the attachment element for attaching the respective sensor to the plate is, for instance, a screw. However, also other attachment elements can be used like plastic clips. The one or more sensors can include at least one sensor of a group consisting of a location sensor like a GPS, GLONASS, Galileo and/or Beidou sensor, a temperature sensor, a WiFi module, a presence sensor, a particulate matter sensor, et cetera. The WiFi module can be used, for instance, for determining a number of devices in the environment of the vehicle, wherein this determination might be carried out by the WiFi module, the controller or the server based on the initial data sensed by the WiFi module. From determining a number of devices in the environment of the vehicle, a number of persons can be concluded. In particular, the WiFi module can be used to determine a number of participants in traffic. The WiFi module can also be used for determining other parameters like a time of presence of one or several devices or persons or the type of device used by a respective person in the environment of the vehicle. The type of device might be, for instance, a mobile phone, a laptop, a tablet, et cetera.

The display preferentially comprises a display controller, wherein the display is connected to the controller by connecting the display controller to the controller. Also the display controller can be attached to the plate. In an embodiment, the display is an electronic paper display and the display controller comprises a sub-controller for triggering the electronic paper display, i.e. for triggering the respective pixel within the electronic paper display. The communicator can be attached directly to the plate or indirectly by being attached to the controller which in turn is attached to the plate.

Preferentially, the frame is attached to the display by using attachment elements which are configured to allow a user to detach the frame from the display and to attach the frame to another display. This allows to easily replace the display by another display which might be of another type, thereby allowing for a further increased adaptability of the apparatus. In other words, the same frame and/or the same plate and/or the same back wall might be used with different types of displays. The different types of displays can include, for instance, LCDs, electronic paper displays, LED screens, touch screens, et cetera. It is also possible to modify the number of displays simultaneously provided by the apparatus. For instance, the same frame and/or the same plate and/or the same back wall might be used with a single display having certain dimensions or with several displays which can be arranged side-by-side and which together have in the respective arrangement the same certain dimensions.

The frame can be attached to the plate by using attachment elements which are configured to allow a user to detach the frame from the plate and to attach the plate to another frame and/or to attach the frame to another plate. Also this allows for a further increased adaptability of the apparatus. In particular, the inner surfaces of the frame comprise grooves accommodating the attachment elements which are configured to fasten the plate to the frame. The attachment elements can comprise slot nuts and an angle plate, wherein the slot nuts are accommodated in the groove and wherein the angle plate is attached to the slot nuts and the plate. This leads to a stabile fastening of the plate to the frame, wherein still the frame can be easily detached from the plate to further increase the adaptability of the apparatus.

In an embodiment, the display is connected to the controller via one of a plurality of display connectors of the controller, wherein the plurality of display connectors is configured to be connected to different types of displays. Thus, for instance, the display can be detached from the frame and disconnected from the display connector of the controller, and another display, which might be of another type, can be attached to the frame and connected to the controller by using a corresponding one of the plurality of connectors. This allows for a further improved adaptability of the apparatus. It is also possible that a same controller can be used with different numbers of display controllers each controlling a respective display, wherein the respective displays can be of a same type or can have different types. Additionally, it is possible that a same display can be used with different numbers of display controllers. A same controller can therefore be used for different numbers of displays. For instance, a same controller can be used for one 32 inch display or for four 32 inch displays. This allows to easily adapt the size of the display to the size of the vehicle.

Preferentially, the controller is attached to the plate by using attachment elements which are configured to allow a user to detach the controller from the plate and to attach another controller to the plate. Exemplarily, in cases in which a new sensor and/or a new display is attached to the apparatus for which the controller does not have a connector, this allows to replace the controller and to attach another controller to the plate comprising a connector for the new sensor and/or the new display. Thus, the adaptability of the apparatus can further be improved.

In an embodiment, the apparatus comprises a further display configured to display the information, wherein the controller is configured to control the apparatus such that the information received from the external server is shown on the display and the further display, wherein the front wall comprises the display and the further display. Thus, the frame might enclose the display and the further display. The controller preferentially comprises corresponding display connectors for connecting the displays. Additionally, the controller can be configured to receive subinformation for the display and further subinformation for the further display, wherein the subinformation and the further subinformation forms the information to be shown on the display and the further display. The combination of the display and the further display might be regarded as being a total display subdivided in subdisplays showing the subinformation forming the total information to be shown. The controller can also be configured to receive the information for the display and the further display from the server, to subdivide the received information into subinformation to be shown on the display and the further display and to finally provide the subinformation to the display and the further display. The apparatus can also comprise more than one further display i.e. the apparatus can comprise one, two or more displays.

In an embodiment, the front wall further comprises a transparent plate, wherein the transparent plate is attached to the display such that the transparent plate forms the outside of the apparatus. In particular, there can be a gap between the transparent plate and the display, which is filled with a glue. The glue can allow to reduce reflections which is particularly relevant in case of moving objects.

Preferentially, the communicator is attached to the plate by using attachment elements which are configured to allow a user to detach the communicator from the plate and to attach another communicator to the plate. This allows to easily replace the communicator by another communicator which might be of another type, for instance, which might use another communication standard, thereby allowing for an increased adaptability of the apparatus. In other words, the same frame, the same plate, the same back wall and other components might be used with different types of communicators. This is particularly helpful, if the apparatus should be used in different countries using different communication standards, for instance, in Germany and the US. The apparatus can then be simply adapted to the respective national standards by using the respective appropriate communicator. The different communication standards used by the different communicators can include, for instance, GSM (2G), UMTS (3G), LTE Advanced (4G) or 5G.

It is further preferred that the communicator is connected to the controller via one of a plurality of communicator connectors of the controller, wherein the plurality of communicator connectors is configured to be connected to different types of communicators. Thus, for instance, the communicator can be detached from the plate and disconnected from the communicator connector of the controller, and another communicator, which might use another communication standard, can be attached to the plate and connected to the controller by using a corresponding one of the plurality of communicator connectors. This allows for a further improved adaptability and higher versatility of the apparatus.

In an embodiment, the profile elements are identical, i.e. have an identical profile. This allows for an easy production of the profile elements, because it is not necessary to manufacture different or tailored profile elements, wherein nevertheless the profile elements can be used for providing frames having different dimensions by modifying the number and/or length of profile elements used for constructing a respective sidewall of the frame. Upon manufacturing in which a long profile element is cut into different pieces to provide profile elements of desired length, each piece which arises upon the cutting process can be used as a profile element.

Preferentially, the profile elements comprise attachment openings and the corner elements comprise further attachment openings, wherein the connection elements are screws guided through the attachment openings for detachably connecting the profile elements and the corner elements to each other. The attachment openings can comprise threads. However, they can also not comprise threads, wherein in this case the screws are preferentially self-tapping screws.

It is also preferred that a respective profile element comprises first and second elongated cavities along at least a part of the length of the respective profile element, wherein the second cavity comprises C-like structures forming the attachment openings of the respective profile element. Since the profile elements comprise elongated cavities along their length, the profile elements can be produced with reduced usage material and have relatively low weights.

It is further preferred that the back wall comprises attachment openings and the profile elements also comprise attachment openings from the outside of the profile elements to the first cavity, wherein connection elements are guided through the attachment openings for detachably connecting the back wall and the frame to each other. The connection elements are preferentially screws, wherein the attachment openings can comprise threads. However, they can also not comprise threads, wherein in this case the screws are preferentially self-tapping screws. Since the attachment openings of the profile elements provide a channel from the outside of the respective profile element to the first cavity and since the first cavity does not have a fluid connection to the inside of the casing, water cannot reach the inside of the casing. Therefore, the protection of the casing against water is improved.

It is also preferred that a respective corner element comprises on a surface, which is directed towards a respective profile element, several guiding elements and the respective profile element comprises guiding structures, wherein the guiding elements and the guiding structures are formed such that the guiding structures accommodate the guiding elements if the respective corner element is arranged on the respective profile element in a predetermined position. This simplifies the assembling of the apparatus.

The guiding elements can be formed as planes. Moreover, preferentially the guiding elements on a same surface are not all arranged on one straight line. In particular, the corner element comprises three guiding elements on a same surface, wherein two of the corner elements are arranged on a line. More particular, the three guiding elements can define an imaginary triangle lying in the plane of the same surface, wherein the three guiding elements, exemplarily, respective center points of the guiding elements, define the corners of the imaginary triangle. Furthermore, the guiding elements preferentially comprise bevels at their corners facing towards the respective profile element, wherein the bevels can facilitate assembling the corner elements and the profile elements.

It is also preferred that between a surface of a respective corner element, which is directed towards a respective profile element, and a surface of the respective profile element, which is directed towards the respective corner element, a respective sealing element is arranged. The respective sealing element is preferentially sandwiched and compressed between adjacent surfaces of the respective corner element and the respective profile element. This allows for a further improved protection of the inside of the casing against water, wherein still the adaptability of the apparatus is high. Each sealing element might provide a sealing with at least two sealing lines.

It is also preferred that the corner elements further comprise spacers configured to ensure that the surface of the respective corner element and the surface of the respective profile element have a predetermined distance, wherein preferentially the spacers are formed as rings surrounding the attachment openings of the corner elements. This allows for a well-defined compression of the sealing elements, which can allow for a defined degree of stability of the connection and protection against water entrance into the casing. Generally, this construction leads to a casing being waterproof and hence weatherproof and it can also be shockproof. This can allow for an increased resistance against environmental and other physical forces and finally increase the lifetime of the apparatus. It can also level out vibrations, thereby increasing the visibility of the image shown by the display.

A respective corner element comprises a first surface directed towards a first profile element and a second surface directed towards a second profile element. Moreover, the respective corner element preferentially comprises parallel planar ribs, wherein the first and second surfaces are arranged with an angle of 90 degree relative to each other and wherein the ribs connect and are orthogonal to the first and second surfaces. Moreover, preferentially the respective corner element further comprises a cover attached to the ribs. These features allow for an improved distribution of forces acting on the apparatus and for a good attachment of the cover to the respective corner element by, for instance, using glue, wherein still the weight of the apparatus can be relatively low.

In an embodiment, the plate is L-shaped. The term "L-shape" describes preferably that the plate has two legs, i.e. a first leg and a second leg, wherein one of the first and second legs is shorter than the other of the first and second legs. The L-shape, particularly the first leg and/or the second leg, might comprise one or several recesses. If the plate is L-shaped, the same plate can easily be used with different rectangular casings having different sizes, because it can in any case be attached to two inner sides of the rectangular casing. Different sizes of the casing might be used, in order to allow the use of different sizes of the display. Thus, due to the L-shape of the plate, the same plate can be used with different sizes of the display. This apparatus can therefore relatively simply be adapted to different display sizes by just replacing the casing with the display and still using the same plate.

In an embodiment, the back wall comprises a metal part and a plastic part. In particular, the sensor might be arranged behind the plastic part of the back wall. This can allow for an improved reception of signals by the sensor, if a reception of signals is required by the sensor as in the case of a GPS sensor. Thus, for instance, a GPS sensor or another localization sensor might be arranged behind the plastic part of the casing on the plate. Additionally or alternatively, the back wall can comprise a hole in which a power cable is arranged for providing power to the components on the plate, particularly to power distributor on the plate, within the casing. The hole with the power cable is preferentially sealed against water and humidity, in order to not allow water and humidity to enter the casing.

Preferentially, the back wall comprising a metal part and a plastic part is substantially planar, wherein the plastic part is arranged in an upper portion of the back wall, if the apparatus is attached to the vehicle. Preferably, the metal part is planar and the plastic part is not planar such that the plastic part protrudes from the back wall, wherein in this case the plastic part partly surrounds a cavity. The upper part of the outer surface of a vehicle body is generally curved towards the mid of the vehicle such that there will be a gap between the back wall of the casing and the outer surface of the vehicle body. If the sensor is then placed behind the plastic part of the back wall, it is placed adjacent to the gap such that a measurement carried out by the sensor is less disturbed or not disturbed at all by the outer surface of the vehicle body, thereby improving the quality of the measurement. Preferably, the sensor can be positioned at the plate behind the plastic part, wherein in case in which the plastic part protrudes from the back wall and the plastic part comprises a cavity, the sensor can be included in the cavity of the plastic part.

In an embodiment, the apparatus further comprises a storage unit configured to store information to be displayed, wherein the controller is configured to control the apparatus such that information which is stored in the storage unit is shown on the display, if information to be displayed is not received from the external server. This allows to still show information on the display if no information is received from the external server. Preferably, the storage unit is a cache which temporarily stores the information to be displayed. The controller can be configured to use a decision tree or another intelligence for determining which stored information should be shown if no information is received from the external server.

It is preferred that the apparatus further comprises a power distributor adapted to receive power from a power supply and adapted to distribute the power among the electrical components on the plate, wherein the power distributor is attached to the plate by using attachment elements which are configured to allow a user to detach the power distributor from the plate and to attach another power distributor to the plate. This allows to easily adapt the apparatus to a respective power supply by using the power distributor which fits to the power supply. For instance, in cases in which the apparatus is attached to a car, the apparatus receives power from a battery of the car, whereas in cases in which the apparatus is attached to a bus, the apparatus receives power from a battery of the bus, wherein the car battery and the bus battery might provide different voltages. Removing only the power distributor and attaching another power distributor allows to attach the apparatus to different types of vehicles.

It is also preferred that the power distributor is adapted to stop distributing the power to the several electronic components if the received power falls below a predetermined threshold. Thus, if the power supply is a battery, in particular, the battery of a vehicle, and if a charge state of the battery is low, the power distributor stops distributing the power. Thus, the battery is protected by the power distributor against becoming fully discharged by the apparatus.

In an embodiment, the power distributor is adapted to be controlled externally from the apparatus. This allows a user to provide settings like the predetermined threshold to the power distributor when the power distributor is still included into the casing of the apparatus. The power distributor can be adapted to allow for a corresponding data connection for externally controlling the power distributor.

It is further preferred that the power distributor is adapted to stop distributing the power to the several electrical components, if the value of measured temperature exceeds a predetermined threshold. Thus, the power distributor can be adapted to guard the electrical components and/or the apparatus. The power distributor is adapted to shut down all electrical components, if the temperature inside the casing of the apparatus exceeds a range in which it is ensured that the electrical components function correctly.

In an embodiment, a camera is attached to the frame, the front wall and/or the back wall wherein the camera is configured to acquire images of the environment of the apparatus and hence of the vehicle, if the apparatus is attached to the vehicle, wherein the camera is connected to the controller which is configured to process the images for generating image-related data and to control the apparatus such that the generated image-related data are sent to the external server. This allows the server to provide the information to be displayed also based on the image-related data. Preferably, the information to be displayed are chosen based on the image-related data. Exemplarily, if the camera is configured to acquire images of a pavement and the controller is configured to process the images for generating data of a number of persons with respect, for instance, to the age of the persons present on the pavement, the information to be displayed can be chosen based on the number of persons with respect to the age of the person. In an example, if the image-related data includes a number of middle aged men present on the pavement, the information to be displayed can be chosen based on a general interest of middle aged men when the number of middle aged men is above a predetermined threshold. In this context, the image-related data can also include a number of all persons and the number of middle aged men present on the pavement, wherein the information to be displayed is chosen when the ratio of the number of all persons and the number of middle aged men is above a predetermined threshold. The camera can be integrated in the frame, the front wall and/or the back wall. One or several cameras can be attached to the frame. The camera can be configured to acquire the images such that they form a video, i.e. the camera can be a video camera.

Preferentially, the apparatus further comprises a sealing positioned between the back wall and the frame, wherein the sealing is accommodated in a groove of the frame. This allows for a further improved protection against environmental conditions. Moreover, this protection can be accurately provided in a relatively short time during a still very simple assembling of the apparatus, because the positioning of the sealing is easy due to the groove in the frame.

In an embodiment, the back wall comprises an attachment element for attaching the back wall of the casing to the vehicle, wherein the attachment element comprises a rail element which is horizontally orientated, if the apparatus is attached to the vehicle. This allows for a robust attachment of the apparatus to the vehicle, wherein still a positioning of the apparatus and hence of the display in the horizontal direction is possible. This can also allow for an increased flexibility with respect to the type of the vehicle, i.e. car, transporter et cetera, and/or with respect to the model of the vehicle, i.e., for instance, with respect to the brand. The rail element might also be attached to the frame of the apparatus. This allows to distribute forces occurring by attaching the apparatus to the vehicle not only to the plate but also to the frame of the apparatus. Hence, the durability of the plate can be preserved and the stability can be increased.

In an embodiment, the back wall comprises holes through which attachment elements are provided for attaching the back wall of the casing to the vehicle, wherein spacers are positioned between the back wall of the casing and the vehicle.

In a further aspect of the present invention a kit configured for assembling an apparatus as defined above is presented, wherein the kit comprises:
 a sensor,
 a communicator configured to communicate with an external server,
 a controller configured to control the apparatus to be assembled such that sensor data from the sensor are sent to an external server and information received from the external server is shown on a display which is configured to display the information,
 a plate configured to be equipped with the controller, the sensor and the communicator,
 a back wall which is directed towards the vehicle when the apparatus is attached to the vehicle and which is configured to form a back side of a casing of the apparatus,
 a frame element for forming a frame, wherein the frame elements include profile elements configured to form sidewalls of the casing and corner elements configured to form corners of the casing, wherein the back wall and the frame elements are configured to form together with the display the casing, wherein a front wall of the casing comprises the display.

In another aspect of the present invention an assembling method for assembling an apparatus as defined by claim 1 is presented, wherein the method comprises:
 providing a kit configured for assembling an apparatus as defined above,
 connecting the sensor to a sensor connector of the controller and connecting the controller to the communicator and a display which is configured to display information such that sensor data from the sensor are sendable to an external server and information received from the external server is showable on the display,
 equipping the plate with the controller, the sensor and the communicator,
 forming a casing by using the back wall, the display and the frame elements such that a) the back wall is directable towards a vehicle when the apparatus is attached to the vehicle and forms a back side of the casing, b) the frame elements form a frame, wherein the frame elements include profile elements forming sidewalls of the casing and corner elements forming corners of the casing, c) a front wall of the casing comprises the display and d) the plate with the controller, the sensor and the communicator is within the casing.

In a further aspect of the present invention a system for displaying information on a vehicle is presented, wherein the system comprises:
 an apparatus configured to be attached to the vehicle as defined by any of the above description or the claims 1-23, and
 a server configured to receive sensor data from the apparatus and to send information to be displayed to the apparatus depending on the received sensor data.

Figure 2:
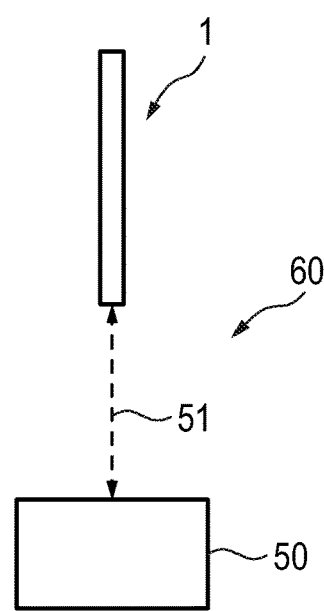
FIG. 2 illustrates schematically and exemplarily a system for displaying information on a vehicle, which comprises the apparatus.

FIG. 1 shows schematically and exemplarily a vehicle 2 with an embodiment of an apparatus 1 for displaying information, wherein the apparatus 1 is attached to a back door of the vehicle 2. The apparatus 1 comprises a display 3 configured to display information received from an external server 50 which is schematically and exemplarily illustrated in FIG. 2.

The apparatus 1 and the external server 50 are configured to communicate with each other via a communication connection 51. The communication connection 51 is a wireless communication connection. It can be any wireless communication connection which allows to exchange data between the apparatus 1 and the external server 50. The apparatus 1 together with the server 50 form a system 60 for displaying information on the vehicle 2. The server 50 is configured to receive sensor data from the apparatus 1 and to send information to be displayed to the apparatus 1 depending on the received sensor data. The sensor data can be, for instance, location data, temperature data, presence data providing information about the presence of devices or persons around the vehicle, particulate matter sensor data, et cetera.

Figure 3:
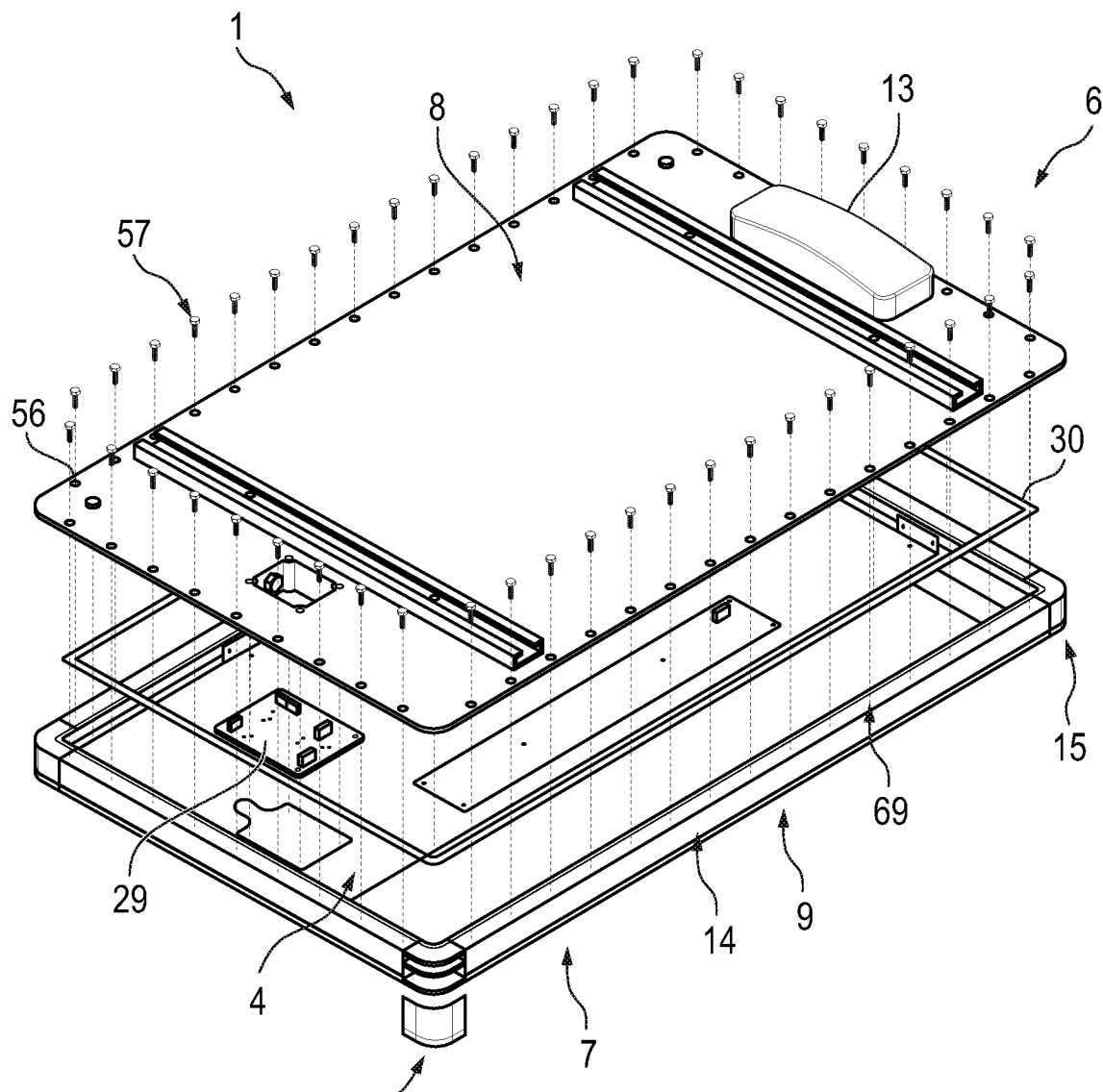
FIG. 3 shows schematically and exemplarily an exploded view of the apparatus for displaying information on a vehicle.

FIG. 3 shows schematically and exemplarily components of the apparatus 1 in more detail in an exploded view. The apparatus 1 comprises a plate 4 within a casing 6, wherein some electrical components attached to the plate 4 are schematically and exemplarily illustrated in FIG. 4. The plate 4 comprises a controller 5, a sensor 80 and a communicator 55 configured to communicate with the external server 50 via the communication connection 51. The controller 5, which might be a Gumstix controller or another type of controller, is configured to control the apparatus 1 such that sensor data from the sensor 80 are sent to the external server 50 and information received from the external server 50 is shown on the display 3, wherein the sensor 80 is attached to the plate 4 by using an attachment element which is configured to allow a user to detach the sensor 80 and to attach another sensor to the plate 4 and wherein the sensor 80 is connected to the controller 5 via one of a plurality of sensor connectors 81 of the controller 5, wherein the plurality of sensor connectors 81 is configured to be connected to different types of sensors.

Preferably, the sensor 80 can be detached from the plate 4 and disconnected from the connector 81 of the controller 5 and another sensor, which might be of another type, can be attached to the plate 4 and connected to the controller 5 by using a corresponding one of the plurality of connectors 81. Thus, one or several desired sensors can be used with the apparatus 1, in order to provide a desired sensing functionality. The plate 4 can comprise one or more sensors, wherein the one or more sensors can include at least one sensor of a group consisting of a location sensor like a GPS, GLONASS, Galileo and/or Beidou sensor, a temperatures sensor, a WiFi module, a presence sensor, a particulate matter sensor, et cetera.

If the plate 4 comprises a WiFi module as the sensor 80, the controller 5 can be configured to determine a number of devices or persons in the environment of the vehicle 2 based on the WiFi information of the WiFi module. However, this determination of the number of devices or persons could also be carried out by the WiFi module itself or by the external server 50. In an embodiment, a number of participants in traffic is determined and/or a time of presence of one or more persons and/or a type of a device used by a respective person in the environment of the vehicle 2 is determined by the WiFi module, the controller 5 or the server 50, wherein the type of device might be, for instance, a mobile phone, a laptop, a tablet, et cetera.

The attachment element for attaching the respective sensor 80 to the plate 5 is preferentially a respective screw which allows to easily replace a sensor by another sensor. However, also other attachment elements can be used like plastic clips. In the case in which the back wall 8 comprises a plastic part 13, the sensor 80 is preferentially attached behind the plastic part 13 or inside a cavity of the plastic part 13 of the back wall 8. Additionally to the sensor 80, another sensor can be attached to the apparatus, exemplarily to the display 3, wherein another sensor can be provided in glue attaching the display 3 to a transparent plate 7.

The plate 4 can comprise openings 10, 87, wherein, for instance, the openings 10, 87 allow to connect electrical components attached to one side of the plate 4 with components on the other side of the plate 4. The opening 87 can be used to connect the power distributer 29 with its power supply by a cable 96, wherein the cable 96 can be guided through the opening 87. The openings 10 allow, exemplarily, a wired connection of the sub controller 54 being attached on one side of the plate 4 with the display controllers 52, 53 which are attached in this embodiment to the display 3 which is on the other side of the plate 4. The display 3 preferentially comprises more than one display controller 52, 53, wherein the display 3 is connected to the controller 5 by connecting the display controllers 52, 53 to the controller 5, wherein this connection can further include that the display controllers 52, 53 are connected to a sub controller 54 and the sub controller 54 is connected to the controller 5. Alternatively to attaching the display controller 52, 53 to the display, the display controllers 52, 53 can be attached to the plate 4 which preferentially is a metal plate. In an embodiment, the display controllers 52, 53 can be configured such that an upper display controller 53 controls the upper part of the display 3 and such that a lower display controller 52 controls the lower part of the display 3. The display controllers 52, 53 and the sub controller 54 can be understood as a timing controller of the display 3. In particular, the display controllers 52, 53 and the sub controller 54 trigger the display 3, i.e. activate each pixel with a comparably low electricity input once before the pixel is able to change colours. In case, of LED or ELD displays 3, each pixel has to be activated permanently by the display controllers 52, 53 and the sub controller 54 which increases the energy consumption of the triggering of the display 3. The sub controller 54 can exemplarily be an eJump controller.

Figure 4:
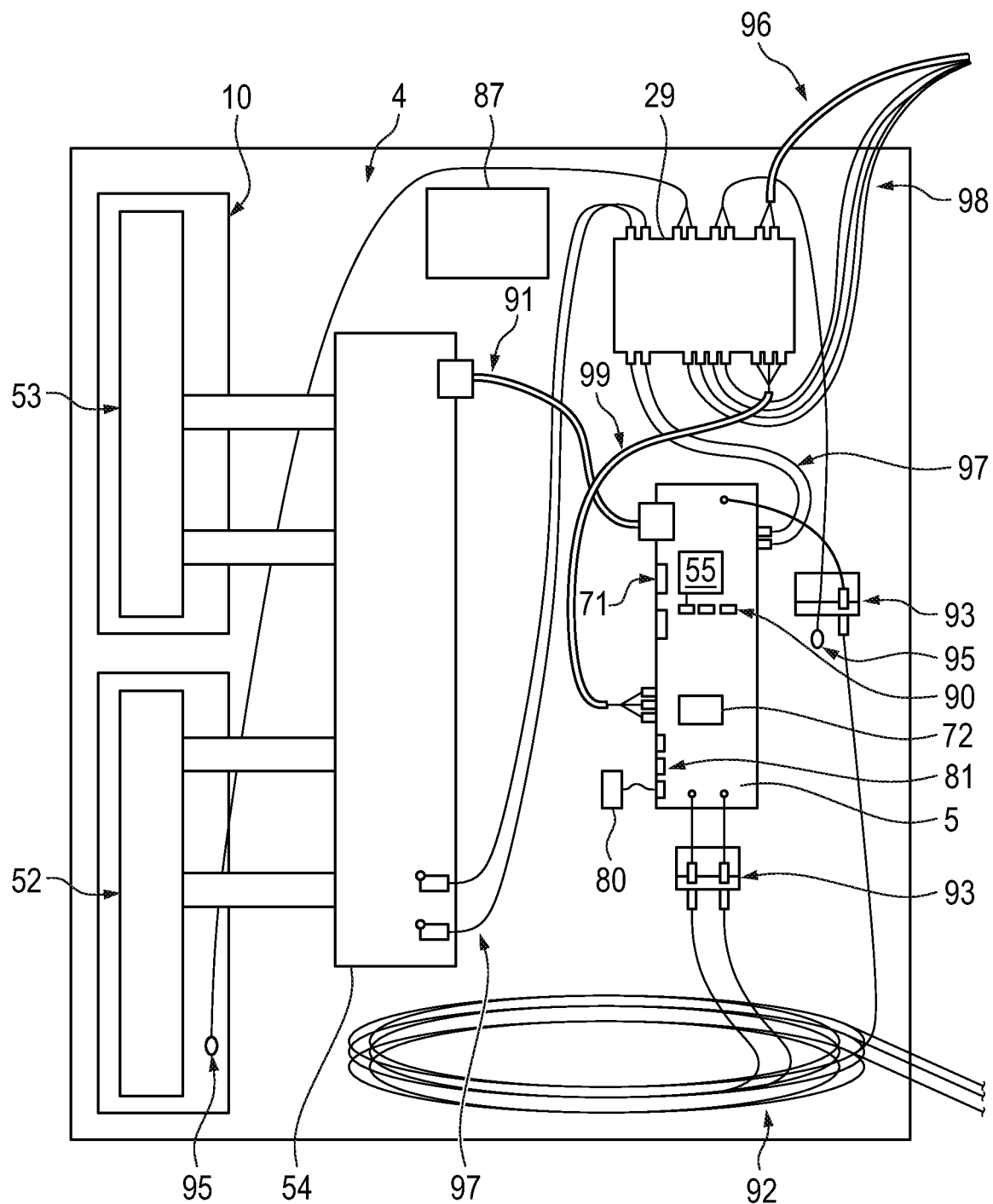
FIG. 4 shows schematically and exemplarily electrical components on a plate within a casing of the apparatus for displaying information on a vehicle.

The communicator 55 is in this embodiment, shown in FIG. 4, indirectly attached to the plate 4 by being attached to the controller 5 which in term is attached to the plate 4. The communicator 55 can be connected to the controller 5 by means of the communication connectors 90. Moreover, the communicator 55 is connected to an antenna cable 92, which can be a GPS antenna cable, via the controller 5 and the connections 93, which can be a GPS-LTE connection to a SIMCOM module. Exemplarily, the communicator 55 is a Raspberry Pi Compute Module. The antenna cable 92 connects the controller with an antenna (not shown), wherein the antenna can be positioned outside of the apparatus 1, preferably above the vehicle, or can be included in the apparatus 1, preferably, in the plastic part 13 of the back wall 8.

The apparatus 1 can receive power from an external power supply (not shown). As illustrated in FIG. 4, the apparatus 1 can comprise a power distributer 29 which can be attached to the plate 4 and is adapted to receive power from an external power supply and further adapted to distribute the power among the electrical components on the plate 4. The power distributer 29 is connected to the external power supply by means of a cable 96. Exemplarily, the apparatus 1 receives power from a battery of the vehicle 2 to which the apparatus 1 is attached. The power distributer 29 can be connected to a reset button (not shown) by means of a cable 98 such that the power distributer 29 can be started/shut down externally. Thus, the power supply of the whole apparatus can be reset externally by only one reset button. The power distributer 29 is adapted to at least distribute the power to the sub controller 54 and the controller 5 by means of cables 97. Further, the power distributer 29 can be connected to a temperature sensor 95 which is attached to the display 3 or any other electrical component of the apparatus 1 such that the power distributer 29 is adapted to stop distributing the power to the several electrical components, if a value of a measured temperature exceeds a predetermined threshold.

Further connections of the electrical components in FIG. 4 are shown by a USB cable 91 connecting the controller 5 with the sub controller 54 and a shielded three-core cable 99 which connects the power distributer 29 with the controller 5, wherein the apparatus 1 is not limited to these cables and also other cables can be used to connect the electrical components. The controller 5 can comprise free connectors 71, 81 allowing the connection to other electrical components (not shown). Free connectors can be HDMI outputs, USB outputs etc.

Referring to FIG. 3, the casing 6 comprises a front wall 7 which is directed away from the vehicle 2 when the apparatus 1 is attached to the vehicle 2, a back wall 8, which is directed towards the vehicle 2 when the apparatus 1 is attached to the vehicle 2, and a frame 9 forming side walls of the casing 6. The front wall 7 comprises the display 3, wherein the back wall 8 is configured to be attached to the vehicle 2. The frame 9 comprises frame elements including straight profile elements 14 forming side walls of the casing 6 and corner elements 15 forming corners of the casing 6, wherein a respective corner element 15 is detachably connected to two respective straight profile elements 14 by means of connection elements 17 which can be seen in FIG. 5 being an exploded view of a corner region of the casing 6.

Thus, the frame 9 is provided as a modular frame such that, while assembling the apparatus 1 or, for instance, replacing a current display 3 by another display with other dimensions, the frame 9 can easily be adapted to an outer shape of the display and/or a number of displays if the frame should include several displays. In particular, the adding and/or replacing of at least one of the profile elements 14 can lead to an adaptation of the frame to the dimensions of the display 3. In this embodiment, the connection elements 17 are screws, wherein in another embodiment, additionally or alternatively, the connection elements could also be other types of connection elements like clamping elements.

The profile elements 14 are, in this embodiment, made of metal, particularly made of aluminum. An end of one of these profile elements 14 is schematically and exemplarily shown in FIG. 6.

Figure 6:
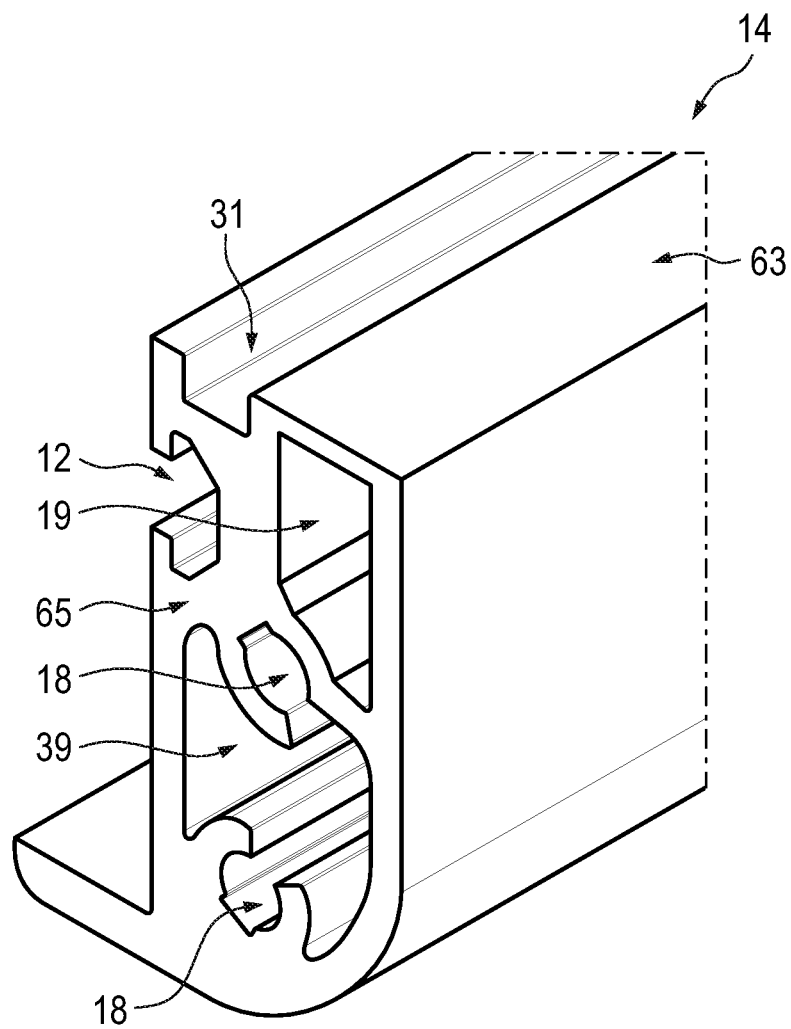
FIG. 6 shows schematically and exemplarily an end portion of a profile element of a frame of the apparatus for displaying information on a vehicle.

As can be seen in FIG. 6, a respective profile element 14 comprises a first elongated cavity 19 and a second elongated cavity 39 along the length of the profile element 14, wherein the second cavity 39 comprises C-like structures 18 forming attachment openings for receiving the connection elements 17, in order to connect a corner element 15 to the profile element 14. In this embodiment, the attachment openings 18 do not comprise threads. The connection elements 17 are therefore self-tapping screws in this embodiment. In another embodiment the attachment openings 18 can also comprise threads, wherein in this case the connection elements 17 can be screws not being self-tapping screws.

Figure 7:
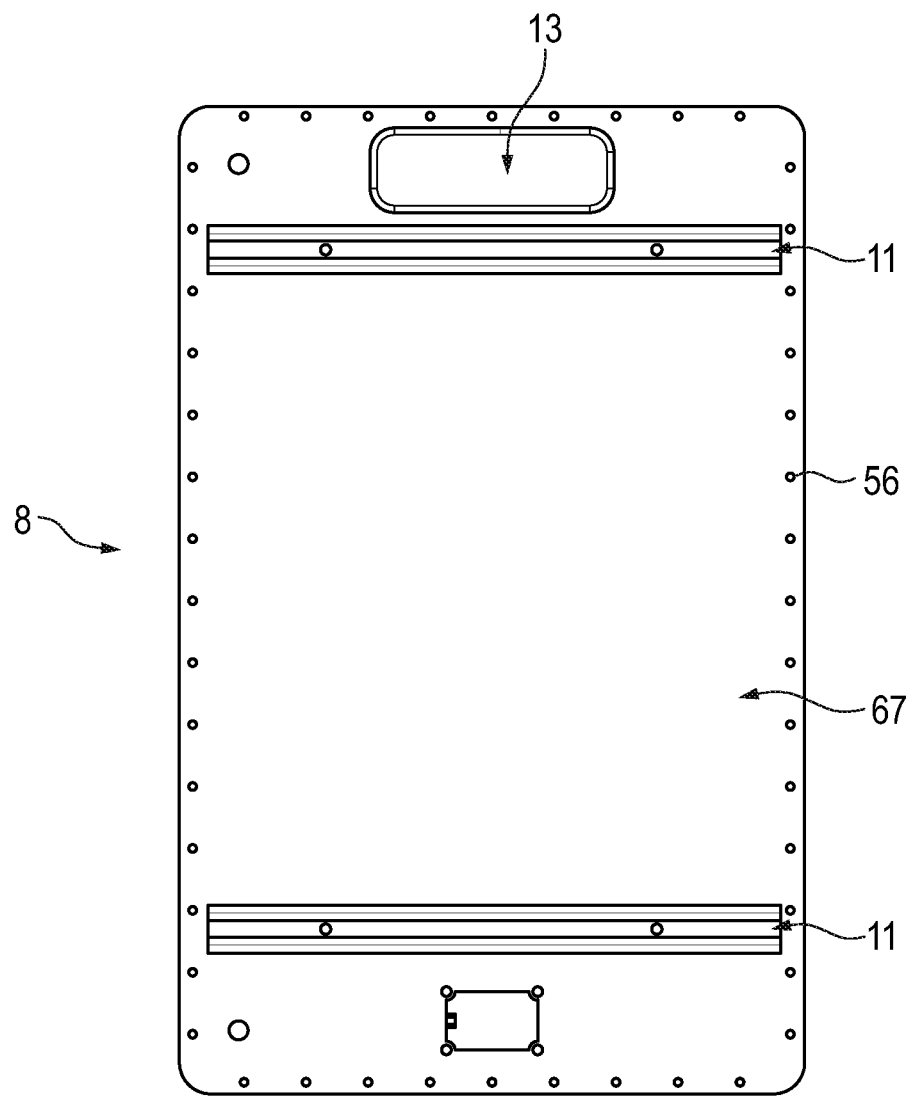
FIG. 7 shows schematically and exemplarily a back wall of the apparatus for displaying information on a vehicle.

The back wall 8, which is also schematically and exemplarily illustrated in FIG. 7, comprises attachment openings 56, wherein connection elements 57, which in this embodiment are screws, are guided through the attachment openings 56 of the back wall 8 and through attachment openings 69 drilled through the in FIG. 6 upper surface 63 of the profile element 14 such that the connection elements 57, i.e. the screws 57, reach the first cavity 19 of the profile element 14. FIG. 6 shows the profile element 14 before the upper attachment openings 56 have been drilled. In this embodiment, the screws 57 are self-tapping screws. However, in another embodiment the attachment openings can comprise threads and the screws are not self-tapping screws.

By using this kind of connection, the back wall 8 and the profile elements 14 can easily be detached from each other, in order to adapt the apparatus 1 as desired. Moreover, since the first cavity 19 does not have a fluid connection to the inside of the casing 6, water cannot reach the inside of the casing 6 through the attachment openings 38. This allows for an improved protection of the inside of the casing 6 against water entrance.

Figure 8:
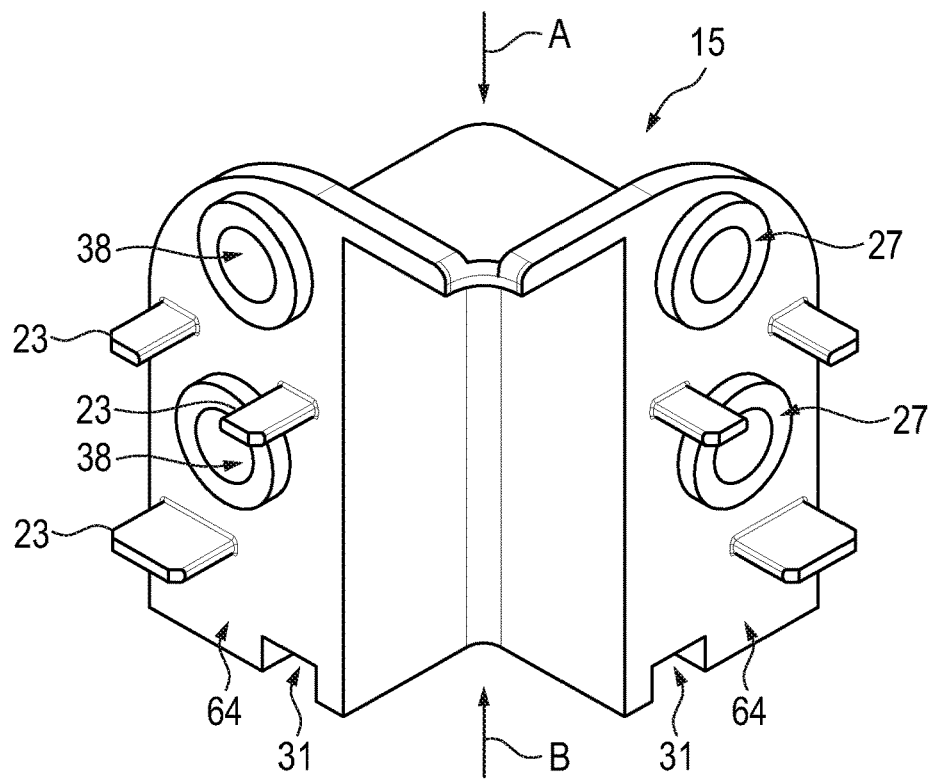
FIG. 8 shows schematically and exemplarily a perspective view on a corner element of the frame of the apparatus for displaying information on a vehicle.

FIG. 8 shows schematically and exemplarily a corner element 15. As can be seen in this figure, the corner element 15 comprises attachment openings 38, wherein the screws 17 are guided through these attachment openings 38 and the attachment openings 18 of the respective profile element 14 for detachably connecting the profile elements 14 and the corner elements 15 to each other. Also these attachment openings 38 might comprise threads or might not comprise threads, wherein in the latter case the screws 17 are preferentially self-tapping screws.

The respective corner element 15 comprises on a respective surface 64, which is directed towards a respective profile element 14, several guiding elements 23. Moreover, the respective profile element 14 comprises guiding structures, wherein the guiding elements 23 and the guiding structures are formed such that the guiding structures accommodate the guiding elements 23 if the respective corner element 15 is arranged on the respective profile element 14 in a predetermined position. The guiding structures of the profile element 14 might be formed by the walls of the first cavity 19 and/or the second cavity 39. The guiding elements 23 together with the guiding structures further simplify the assembling of the apparatus 1.

Figure 9:
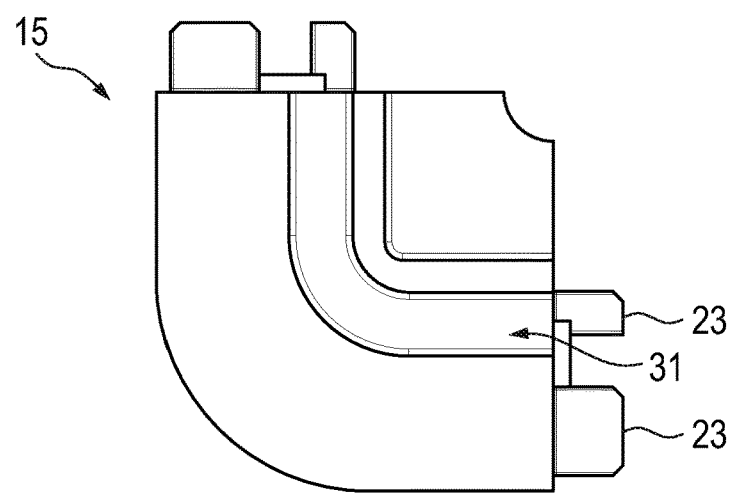
FIG. 9 shows schematically and exemplarily a view on the corner element shown in FIG. 8 in a direction B indicated in FIG. 8.
Figure 10:
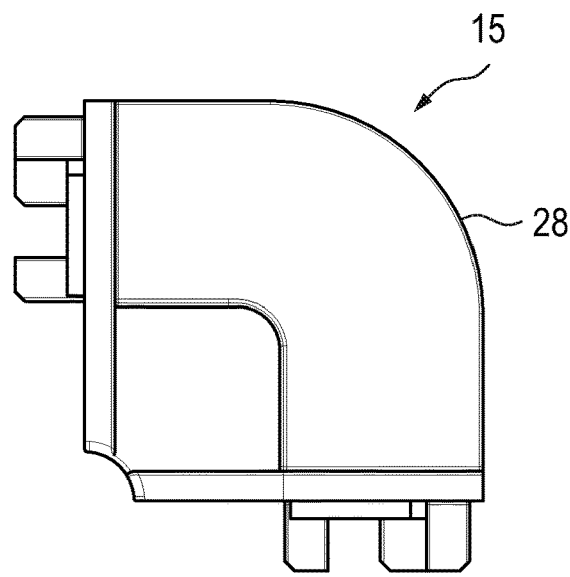
FIG. 10 shows schematically and exemplarily a view on the corner element shown in FIG. 8 in a direction A indicated in FIG. 8.
Figure 11:
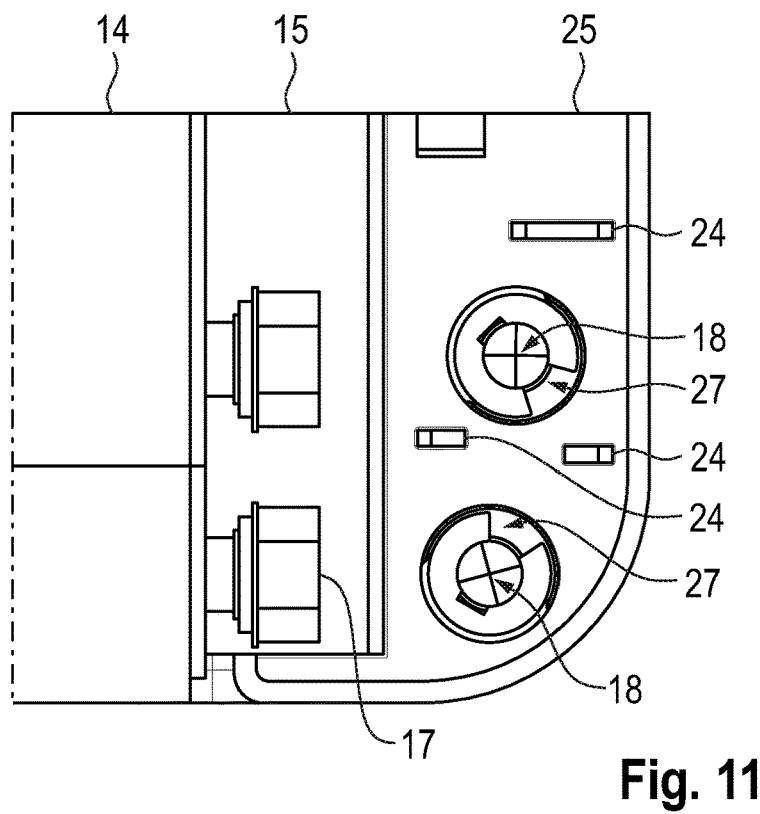
FIG. 11 illustrates schematically and exemplarily components within a corner of the frame of the apparatus for displaying information on a vehicle.

The guiding elements 23 are preferentially formed as planes, wherein the guiding elements 23 on a same surface 64 are preferably not all arranged on a straight line. In particular, in this embodiment the guiding elements 23 on a same surface 64 of the corner element 15 are arranged at corners of an imaginary triangle. Moreover, preferentially the planes defined by the guiding elements 23 are parallel to each other. The guiding elements 23 also comprise bevels 24 (as shown in FIG. 11). Thus, the edges of the guiding elements 23, which are directed towards the respective profile element 14, are slanted. This can also be seen, for instance, in FIGS. 9 and 10, wherein FIG. 9 shows the corner element 15 in a direction B indicated in FIG. 8 and FIG. 10 shows the corner element 15 in the direction A also indicated in FIG. 8. The bevels 24 can facilitate assembling the corner elements 15 and the profile elements 14. The corner elements 15 are preferentially made of a thermoplast like ABS.

Figure 5:
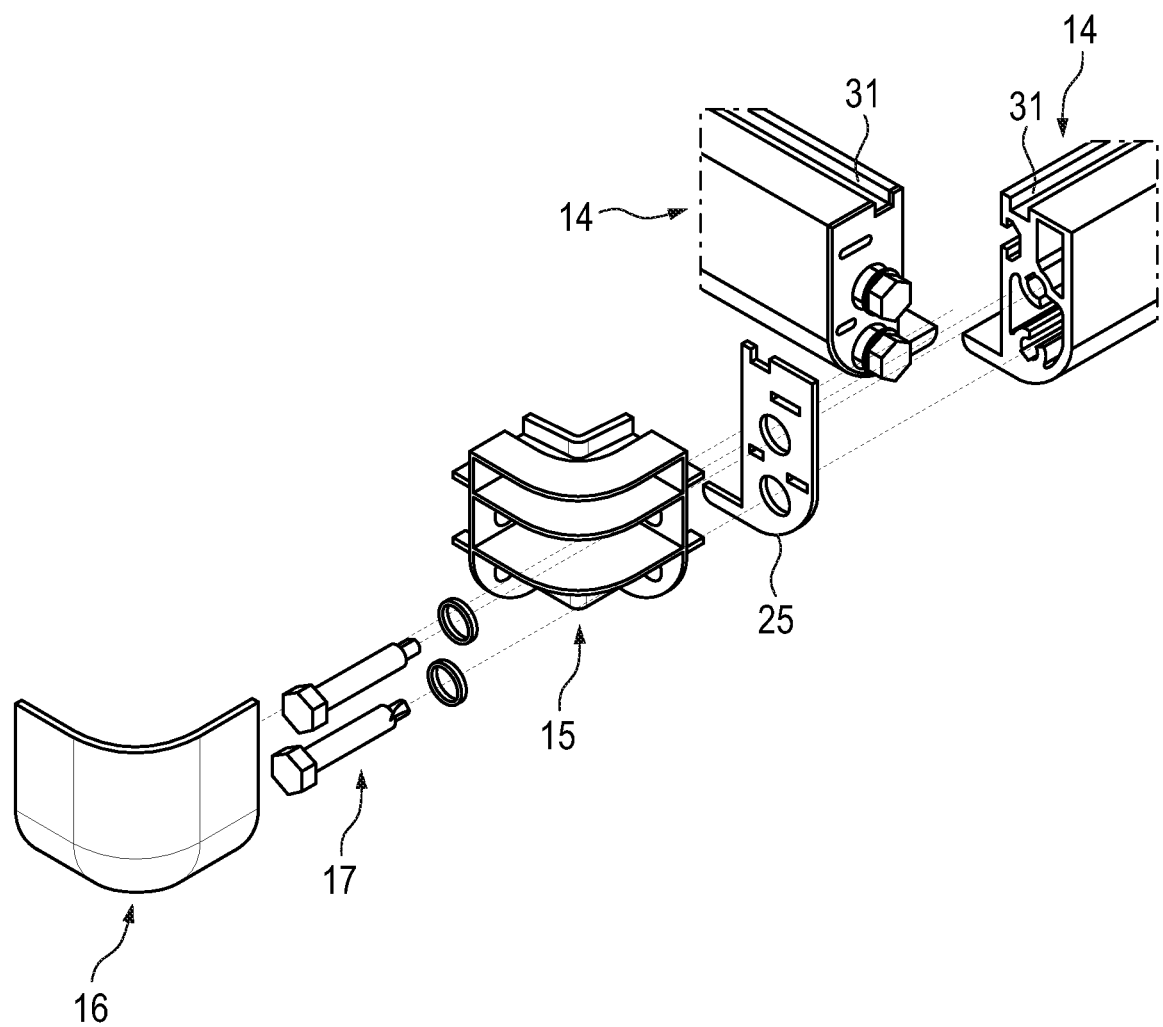
FIG. 5 shows schematically and exemplarily an exploded view of a corner of the apparatus for displaying information on a vehicle.

Between the surface 64 of the respective corner element 15, which is directed towards the respective profile element 14, and the surface 65 of the respective profile element 14, which is directed towards the respective corner element 15, a respective sealing element 25 is arranged which is illustrated, for instance, in FIG. 5. The respective sealing element 25 is sandwiched and compressed between the adjacent surfaces 64, 65 of the respective corner element 15 and the respective profile element 14. This allows for a further improved protection of the inside of the casing 6 against water, wherein still the adaptability of the apparatus 1 is high.

The arrangement of the sealing element 25 between a respective profile element 14 and a respective corner element 15 is schematically and exemplarily illustrated in FIG. 11

The sealing element 25 can provide two sealing lines or areas being virtual lines/areas, wherein the first sealing line or area can be understood as lying on an inward facing edge of the sealing element 25 (left in this figure). The second sealing line or area can be understood as lying on an outward facing edge of the sealing element 25 (right on this figure). The sealing element 25 providing two sealing lines or areas allows for an improved protection of the inside of the casing 6 against water. Preferably, the sealing element 25 is made of EPDM A-KJ 50-00,wherein the thickness of the sealing element 25 is preferably in the range from 1.7 to 2.3 mm.

As indicated in FIG. 8, a respective corner element 15 comprises spacers 27 configured to ensure that the surface 64 of the respective corner element 15 and the surface 65 of the respective profile element 14 have a predetermined distance. In this embodiment, the spacers 27 are formed as rings surrounding the attachment openings 38 of the corner elements 15. The spacers 27 allow for a well-defined compression of the sealing element 25 which can allow for a defined degree of stability of the connection and protection against water entrance into the casing 6. The height of the spacers 27 can be chosen in accordance with the DIN norm of the used screws 17 and/or with respect of the sealing element 25.

Figure 12:
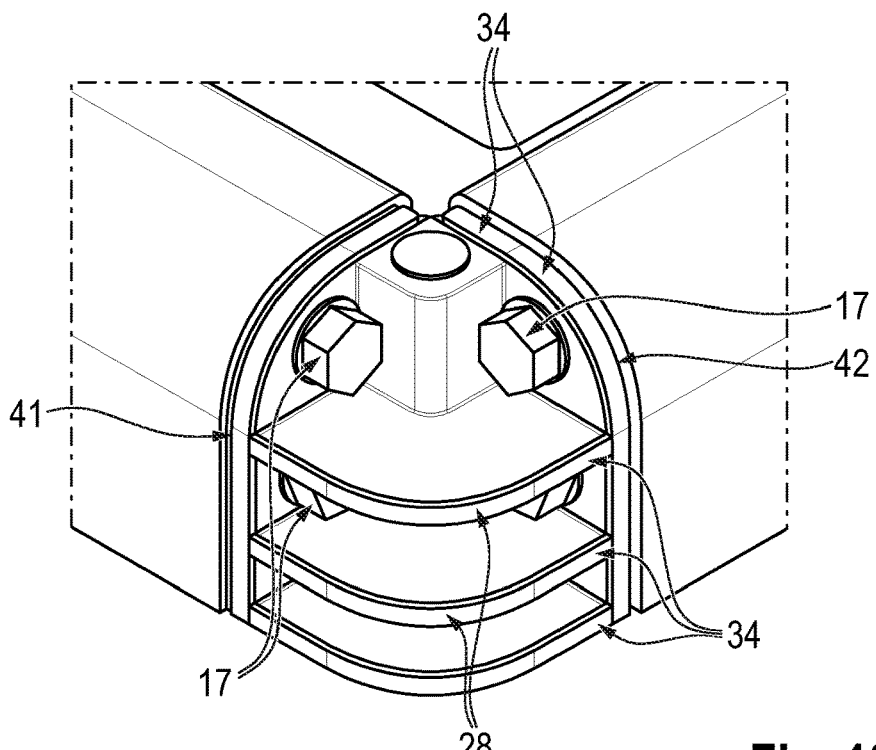
FIG. 12 shows schematically and exemplarily a perspective view on a corner element connecting two profile elements of the apparatus for displaying information on a vehicle, without a cover element covering the inside of the corner element.

Each corner element 15 comprises two surfaces 64 which are directed towards a respective profile element 14. These two surfaces 64 could be regarded as being a first surface 41 and a second surface 42 as schematically and exemplarily illustrated in FIG. 12. As can be seen in this figure, the first and second surfaces 41, 42 are arranged with an angle of 90 degree relative to each other, wherein parallel planar ribs 28 connect the first and second surfaces 41, 42 and are orthogonal to the first and second surfaces 41, 42. This structure with the ribs 28 allows for an improved distribution of forces. Moreover, the ribs 28 and the edges of the first and second surfaces 41, 42 can be used for gluing a cover 16 to the corner element 15. The glue is indicated in FIG. 12 in the right part of the corner element 15 by reference sign 34, wherein corresponding surfaces on the left part of the corner element 15 can be glued. The cover 16 is shown, for instance, in FIGS. 3 and 5.

Figure 13:
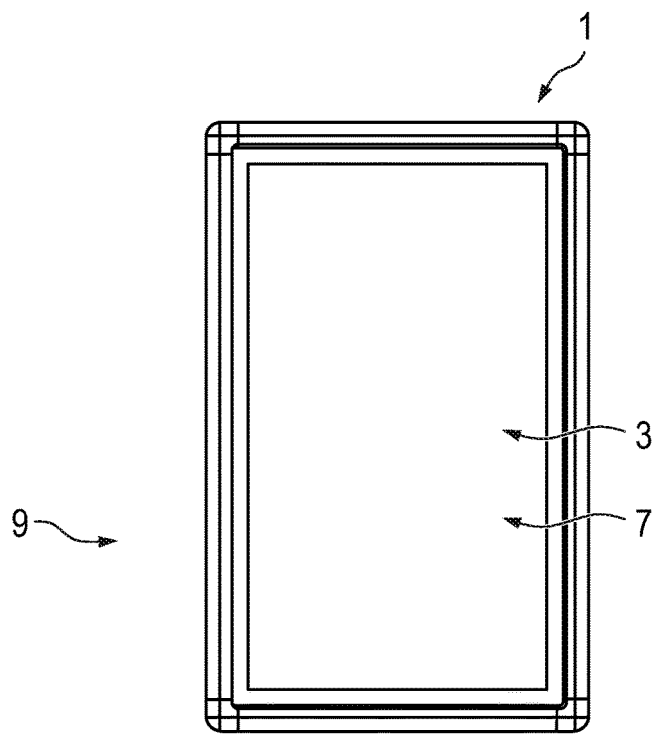
FIG. 13 shows schematically and exemplarily a front side of the apparatus for displaying information on a vehicle.

FIG. 13 shows schematically and exemplarily the front side of the apparatus 1 with the front wall 7 having the display 3 surrounded by the frame 9. The frame 9 is attached to the display 3 by using attachment elements which are configured to allow a user to detach the frame 9 from the display 3 and to attach the frame 9 to another display 3. This allows to easily replace the display 3 by another display which might be of another type, thereby allowing for a further increased adaptability of the apparatus 1. The display 3 can be attached to the frame 9 by means of screws or any other known attachment elements. The display 3 can be attached to the front wall 7 by glue, wherein the front wall 7, which is preferably glass, can be detached from the display 3 by a cutting wire or a solvent.

Figure 14:
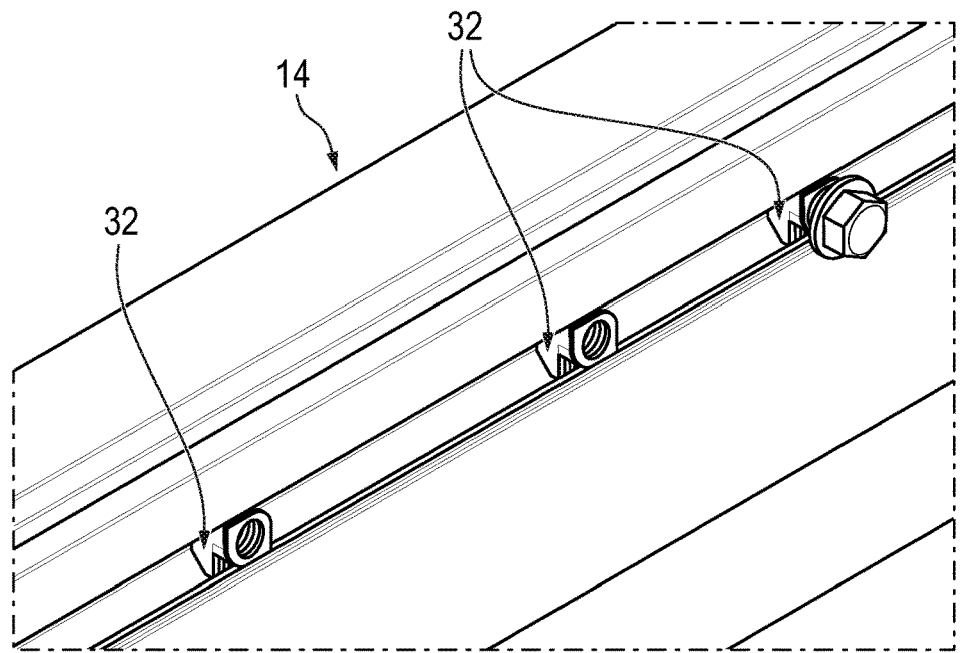
FIG. 14 shows schematically and exemplarily an inner side of a profile element of the frame of the apparatus for displaying information on a vehicle with slot nuts included in a groove.
Figure 15:
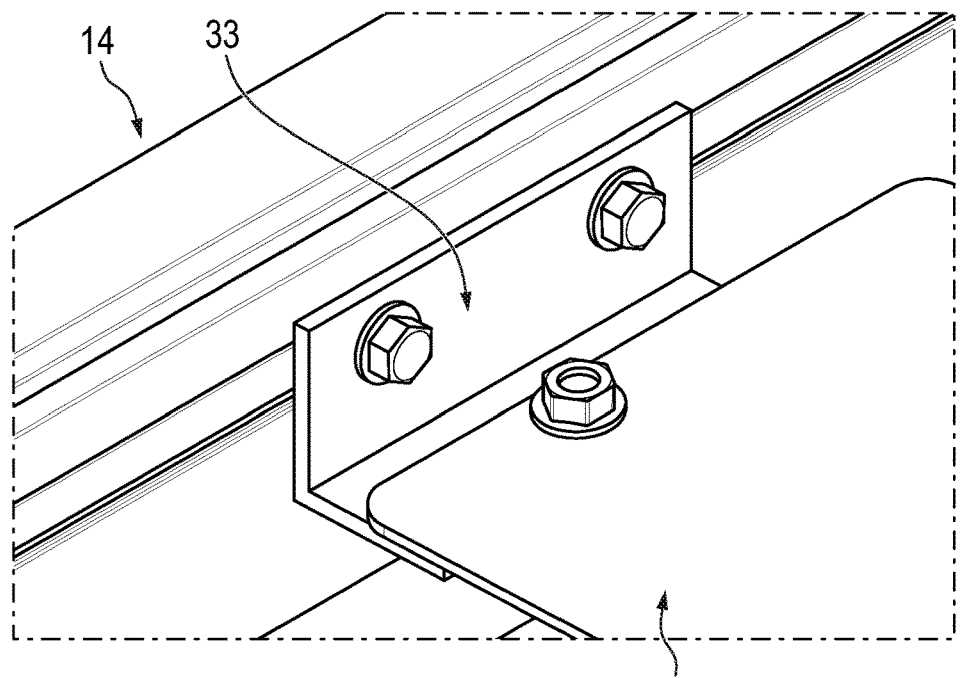
FIG. 15 shows schematically and exemplarily an attachment of the plate to the profile element of the frame of the apparatus for displaying information on a vehicle.

Also the plate 4 and the frame 9 are attached to each other by using attachment elements which are configured to allow a user to detach the frame 9 from the plate 4 and to attach the plate 4 to another frame 9 and/or to attach the frame 9 to another plate 4. This further increases the adaptability of the apparatus 1. In particular, the inner surfaces of the frames 9 comprise grooves 12 accommodating slot nuts 32 to which an angle plate 33 is attached. The angle plate 33 in turn is attached to the plate 4. FIG. 14 illustrates the slot nuts 32 in the groove 12 of a profile element 14, before the angle plate 33 with the plate 4 has been attached to the slot nuts 32. FIG. 15 shows the entire attachment of the plate 4 to the profile element 14 and hence to the frame 9 via the slot nuts 32 within the groove 12 and the angle plate 33. The plate 4 is attached to the angle plate 33 and the angle plate 33 is attached to the slot nuts 32 by using screws. Thus, in this embodiment the attachment elements used for attaching the plate 4 to the frame 9 comprise slot nuts, angle plates and screws. In another embodiment, the plate 4 can be detachably attached to the frame 9 by using other attachment elements.

Also the controller 5 can be attached to the plate 4 by using attachment elements which are configured to allow the user to detach the controller 5 from the plate 4 and to attach another controller to the plate 4. For instance, the attachment elements can also be screws for detachably attaching the controller 5 to the plate 4. In cases, in which a new sensor and/or a new display is attached to the apparatus 1 for which the controller does not have a connector, the controller 5 can easily be replaced by another controller comprising a connector for the new sensor and/or the new display. Thus, by detachably attaching the controller 5 to the plate 4, the adaptability of the apparatus 1 can be further improved. Also the communicator 55 can be attached to the plate 4 directly or indirectly via the controller 5 by using attaching elements which are configured to allow a user to detach the communicator 55 from the plate 4 and to attach another communicator to the plate 4. This allows to easily replace the communicator 55 by another communicator which might be of another type, for instance, which might use another communication standard, thereby allowing for a further increased adaptability of the apparatus 1, because the same frame 9, the same plate 4, the same back wall 8, the same front wall 7, the same controller 5 might be used with different types of communicators.

In order to further increase the adaptability of the apparatus 1, the controller 5 preferentially comprises a plurality of communicator connectors 90 which are configured to be connected to different types of communicators. Thus, the communicator 55 can be detached from the plate 4 and disconnected from a communicator connector 90 of the controller 5, and another communicator, which might use another communication standard, can be attached to the plate 4 and connected to the controller 5 by using a corresponding other one of the plurality of communicator connectors 90.

Figure 18:
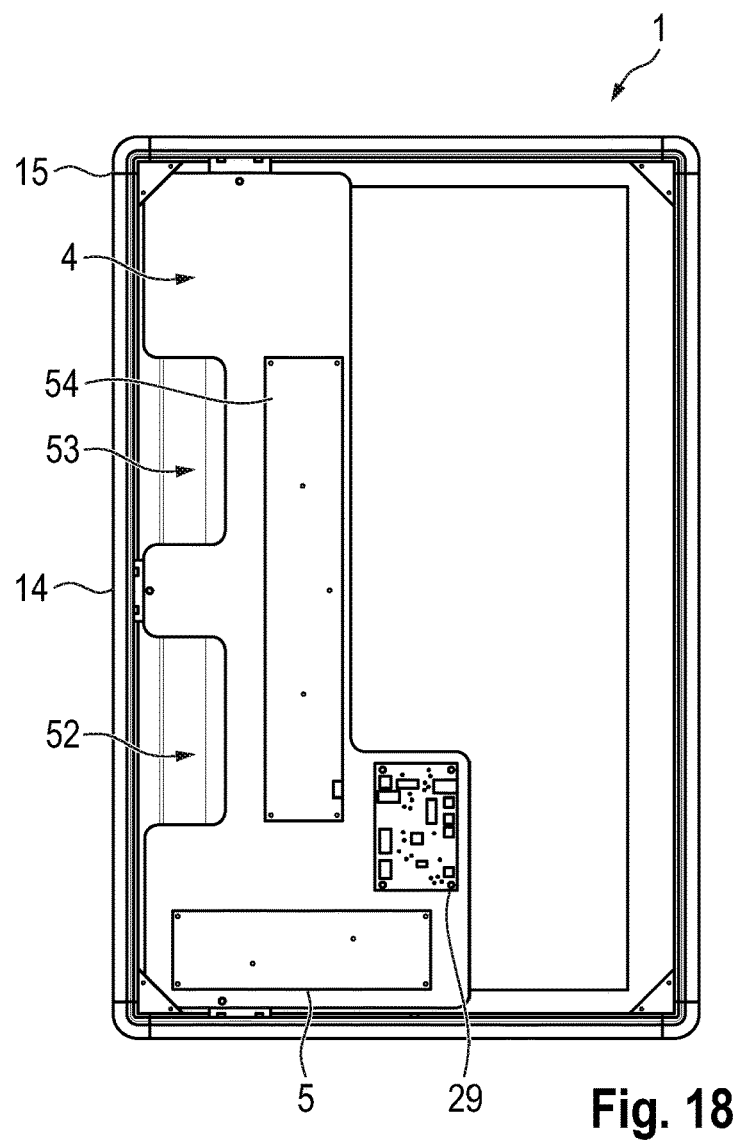
FIG. 18 shows schematically and exemplarily a back view of the apparatus for displaying information on a vehicle comprising an L-shaped plate.

In an embodiment the plate 4 can be L-shaped as shown in FIG. 18. Here, the

L-shaped plate 4 comprises only one L-shaped edge on the right side of the plate 4 due to openings, which can also be regarded as being recesses, on the left side of the plate 4 which allow a connection of the sub controller 54 to the display controllers 52, 53. Thus, the plate 4 has two legs, i.e. a first leg and a second leg, wherein one of the first and second legs is shorter than the other of the first and second legs, wherein in this embodiment the L-shaped plate 4 has two recesses. Alternatively, in cases in which such openings are not needed, the L-shaped plate can also comprise two L-shaped edges. If the plate 4 is L-shaped, the same plate can easily be used with different rectangular casings having different sizes, because it can in any case be attached to two inner sides of the rectangular casing. This can further simplify the adaptability of the apparatus 1.

Figure 16:
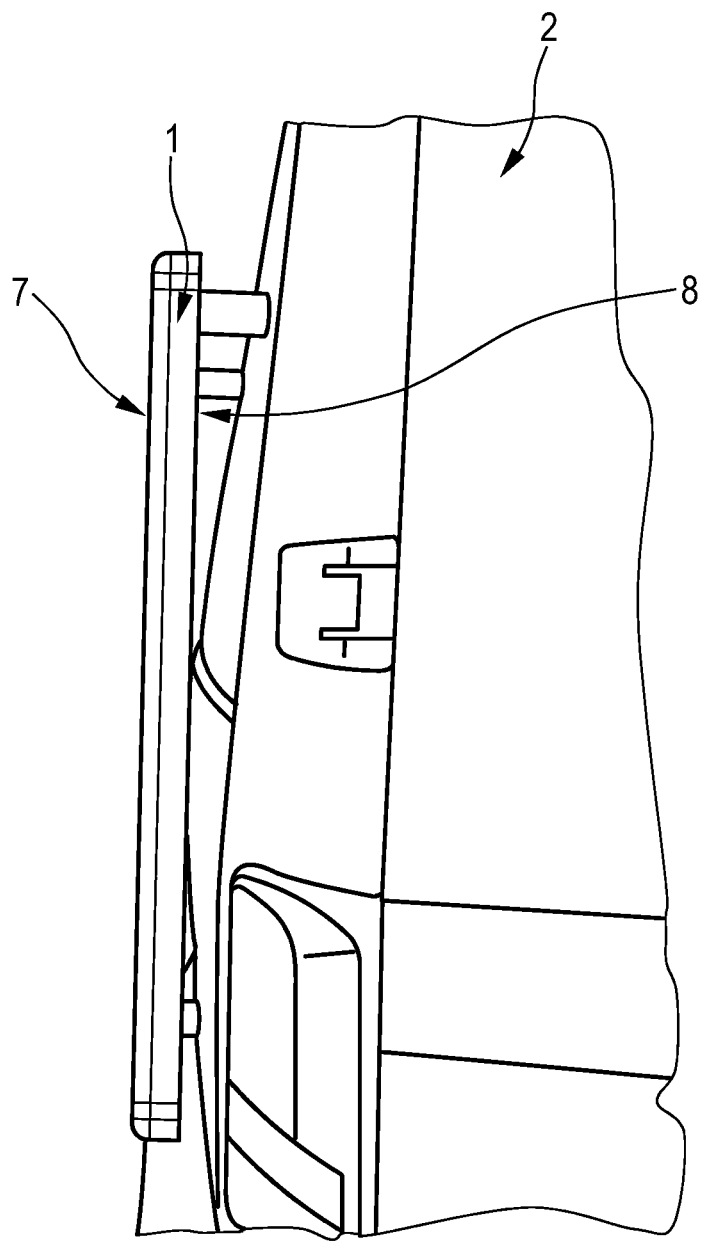
FIG. 16 shows schematically and exemplarily a side view on a vehicle comprising the apparatus for displaying information on a vehicle.

As shown in FIG. 7, the back wall 8 can comprise a plastic part 13 and a metal part 67, wherein the metal part 67 is the larger part. In particular, the back wall 8 can comprise a metal plate forming the metal part 67, wherein the metal plate comprises the plastic part 13. In this embodiment, the back wall 8 is substantially planar, wherein in other embodiments only the metal part 67 is substantially planar as exemplarily shown in FIG. 3 or 17. Moreover, the plastic part 13 is arranged in an upper portion of the back wall 8, if the apparatus is attached to the vehicle 2. As illustrated in FIG. 16, the upper part of the outer surface of the vehicle body is generally curved towards the mid of the vehicle 2 such that there is a gap between the back wall 8 of the casing 6 and the outer surface of the vehicle 2. In an embodiment, the sensor 80 might be placed behind the plastic part 13 of the back wall 8 such that it is placed adjacent to the gap. In particular, the plastic part 13 can comprise at least partly a cavity, wherein the sensor 80 can be positioned inside the cavity of the plastic part 13. A measurement can therefore be carried out by the sensor 80, which is less disturbed or not disturbed at all by the outer surface of the vehicle 2 and/or the metal part 67 of the back wall 8, thereby allowing for an improved quality of the sensor measurement. In particular, a GPS sensor or another localization sensor might be arranged behind the plastic part 13 of the casing 6 on the plate 4. An antenna can also be arranged behind the plastic part 13 or can extend above the vehicle 2 to give the antenna free range to receive and transmit signals.

Figure 17:
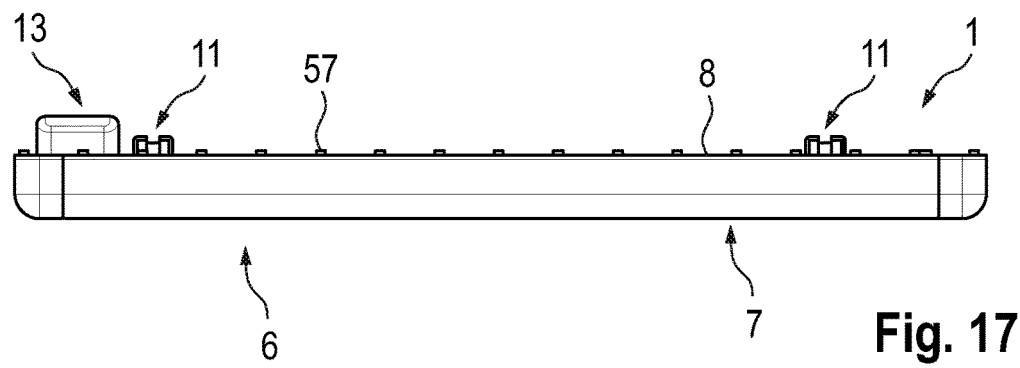
FIG. 17 shows schematically and exemplarily a side view of the apparatus for displaying information on a vehicle, before being attached to the vehicle.

FIG. 17 shows schematically and exemplarily a side view of the apparatus 1 with the back wall 8 comprising rail elements 11.

Figure 19:
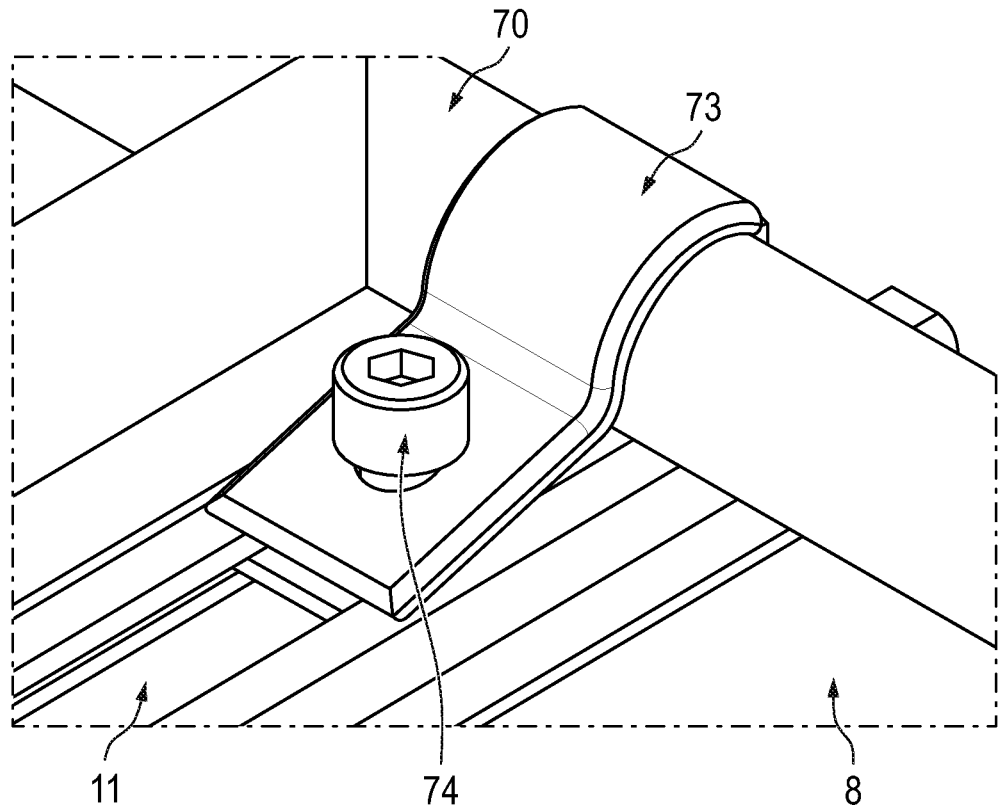
FIG. 19 shows schematically and exemplarily an attachment of the apparatus on a pipe construction of a vehicle.

The back wall 8 comprises rail elements 11 as attachment elements for attaching the back wall 8 of the casing 6 to the vehicle 2, wherein the rail elements 11 are horizontally oriented, if the apparatus 1 is attached to the vehicle 2. In the embodiment shown in FIG. 7, the rail elements 11 are attached to the back wall only. However, in another embodiment the rail elements 11 could also be attached to the frame 9 of the apparatus 1. Exemplarily, the rail elements 11 can be C-rails and can be attached to the back wall 8 and/or frame 9 by screws. Preferably, the vehicle 2 comprises a pipe construction 70 to attach the apparatus 1 to the vehicle 2 by means of the rail elements 11 which are attached to the pipe construction 70, wherein the pipe construction 70 can be regarded as being similar to a bike rack. Exemplarily, as shown in FIG. 19 the apparatus 1 can be attached by means of the rail element 11 to the pipe construction 70 by means of a curved metal plate 73 and a screw 74. The curved metal plate 73 encompasses at least partly a pipe of the pipe construction 70 and is then attached to the rail element 11, i.e. the C-rail, by placing a metal chip into the C-rail and screwing it to the curved metal plate 73.

Figure 20:
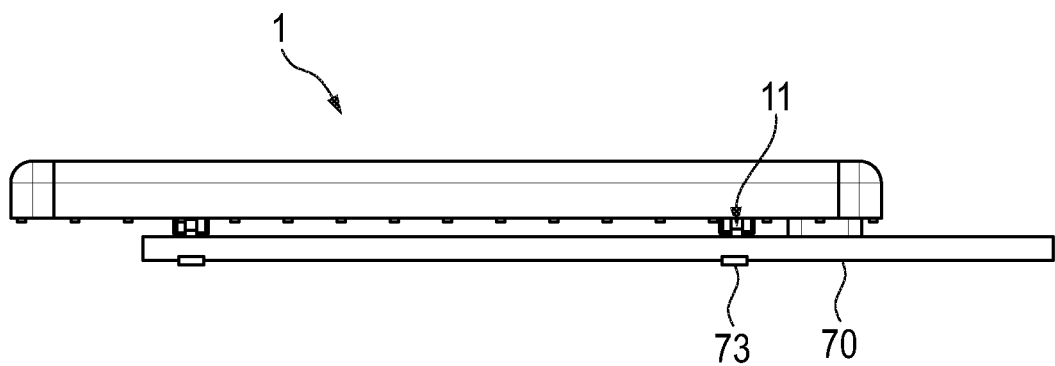
FIG. 20 shows schematically and exemplarily a side view of the apparatus for displaying information on a vehicle after being attached to a pipe construction.

FIG. 20 shows schematically and exemplarily a side view of the apparatus 1 after being attached to a pipe construction 70.

Moreover, in another embodiment as shown in FIG. 16, instead of the rail elements 11, the back wall 8 can be attached to the vehicle 2 by providing holes in the back wall 8 and in an outer wall of the vehicle 2, wherein screws and spacers between the back wall 8 and the outer wall of the vehicle 2 can be used for attaching the apparatus to the vehicle 2 via screws.

The apparatus 1 comprises a further sealing 30 positioned between the back wall 8 and the frame 9, wherein the sealing 30 is accommodated in a groove 31 of the frame 9. This allows for a further improvement of the protection against environmental conditions, particularly against a water entrance into the inside of the casing 6.

The display 3 is connected to the controller 5 via one of a plurality of display connectors 71 of the controller 5 by using a cable 91 which is preferentially a USB cable, wherein the plurality of display connectors 71 is configured to be connected to different types of displays. Thus, the display 3 can be detached from the frame 9 and disconnected from a display connector of the plurality of display connectors 71 of the controller 5 and another display, which might be of another type, can be attached to the frame 9 and connected to the same controller 5 by using a corresponding other one of the plurality of connectors 71. This allows for a further improved adaptability of the apparatus 1. In this embodiment, the display 3 is preferentially an electronic paper display and the display controller 10 comprises a sub-controller 54 for triggering the electronic paper display 3.

The controller 5 further comprises a storage unit 72 configured to store information to be displayed, wherein the controller 5 is configured to control the apparatus 1 such that information which is stored in the storage unit 72 is shown on the display, if information to be displayed is not received from the external server 50. Preferably, the storage unit 72 can be included in the communicator 55, wherein the storage unit 72 can be a cache temporarily storing information. The storage unit 72 stores a certain number of images frequently updated for possibly shown on the display 3 within a current location of the vehicle 2. Even, if no information is received from the external server 50, the vehicle 2 generates data like location, time, devices in proximity etc. The controller 5 is configured to use a decision tree to determine which stored information should be shown if no information is received from the external server 50. The choice of the image displayed in a current location of the vehicle 2 is determined by conditional control statements within an algorithm of the controller 5, wherein the conditional control statements comprises decision nods, chance nods and end nods, wherein predetermined questions lead to a decision to display the image related to the current location of the vehicle 2 at a certain time.

The plate 4 further comprises a power distributor 29 adapted to receive power from a battery of the vehicle 2 via a power cable 96 and to distribute the received power among the electrical components on the plate 4 via cables 97. The power distributor 29 is attached to the plate 4 by using attachment elements which are configured to allow a user to detach the power distributor 29 from the plate 4 and to attach another power distributor to the plate 4. Also with respect to the power distributor 29 the attachment elements can be, for instance, screws, in order to provide a detachable power distributor 29 on the plate 4. This allows to easily adapt the apparatus 1 to a respective battery by using a power distributor which fits to the respective battery. For instance, in cases in which the apparatus is attached to a car, the apparatus receives power from a car battery, whereas in cases in which the apparatus is attached to a bus, the apparatus receives power from a bus battery, wherein the car battery and the bus battery might provide different voltages. Removing only the power distributor and attaching another power distributor allows to use the apparatus with different types of vehicles.

The power distributor 29 is adapted to stop distributing the power to the several electronic components if the received power falls below a predetermined threshold. Thus, if a charge state of the battery of the vehicle 2 is relatively low, the power distributor 29 stops distributing the power, thereby protecting the battery against becoming fully discharged by the apparatus 1. The power distributor 29 can also be adapted to be controlled externally, i.e. external from the apparatus 1. For instance, the power distributor 29 can be adapted to allow a user to provide settings like the predetermined threshold to the power distributor 29 when the power distributor 29 is still arranged within the casing 6 of the apparatus 1. The power distributor 29 preferentially comprises a corresponding communication connection which allows the power distributor 29 to receive, for instance, setting data from an external user interface. Moreover, the power distributor 29 is connected with the controller 5 via a data connection 99.

In this embodiment, the power distributor 29 is also adapted to stop distributing the power to the several electrical components if a measured temperature value exceeds a predetermined threshold. In particular, the power distributor 29 is adapted to shut shown all electrical components, if the temperature inside the casing 6 of the apparatus 1 exceeds a range in which it is ensured that the electrical components function correctly. A corresponding temperature sensor 95, which is connected to the power distributor 29, is therefore preferentially also within the casing 6, in particular integrated in the power distributor 29.

In an embodiment, a camera is attached to the frame 9, when the camera is configured to acquire images of the environment of the apparatus 1 and hence of the vehicle 2. The camera is connected to the controller 5 which in this embodiment is configured to process the images for generating image-related data and to control the apparatus 1 such that the generated image-related data are sent to the external server 50. Moreover, in this embodiment the external server 50 is adapted to provide the information to be displayed also based on the image-related data. The camera can be integrated in the frame, but it can also be integrated in the front wall and/or the back wall.

Figure 21:
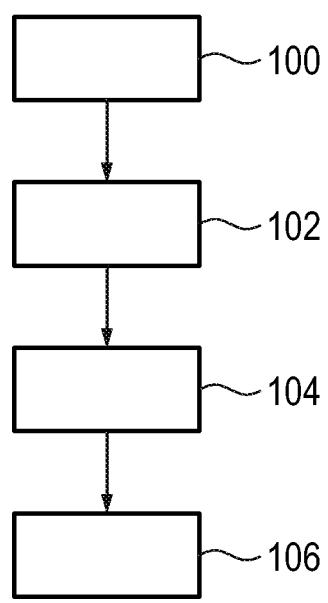
FIG. 21 shows a flowchart exemplarily illustrating an embodiment of a method for assembling an apparatus for displaying information on a vehicle.

In the following a kit configured for assembling the apparatus 1 will be described. The kit comprises the sensor 80, the communicator 55, the controller 5, the plate 4, the back wall 8, the frame elements including the profile elements 14 and the corner elements 15 and the power distributor 29. The kit can comprise further components like cables, attachment elements, connection elements, the above mentioned camera et cetera. The kit can be used for assembling the apparatus 1 as it will be exemplarily described in the following with reference to a flowchart shown in FIG. 21.

In step 100 the kit is provided, which comprises the components which are required for assembling the apparatus 1, wherein it is assumed that the display 3 is given already. In step 102 the plate 4 is equipped with the electrical components like the controller 5, the sensor 80, the communicator 55, the power distributor 29, et cetera. The different electrical components are attached to the plate 4 by using attachment elements which allow to easily detach the electrical components if required for adapting the apparatus. In step 104 the sensor 80 is connected to a sensor connector 81 of the controller 5 and the controller 5 is connected to the communicator 55 and the display 3 such that sensor data from the sensor 80 are sendable to the external server 50 and information received from the external server 50 is showable on the display 3. Moreover, the other electrical components are electrically connected. In step 106 the casing 6 is formed by using the back wall 8, the display 3 and the frame elements 14, 15 such that a) the back wall 8 is directable towards the vehicle 2 when the apparatus 1 is attached to the vehicle 2 and forms a back side of the casing 6, b) the frame elements form a frame 9, wherein the frame elements include profile elements 14 forming side walls of the casing 6 and corner elements 15 forming corners of the casing 6, c) the front wall 7 of the casing 6 comprises the display 3, and d) the plate 4 with the controller 5, the sensor 80, the communicator 55 and the power distributor 29 is arranged within the casing 6.

The assembling method can comprise further steps and the sequence of the steps 102 to 106 might be changed.

Although in above described embodiments the apparatus comprises a single display, in an embodiment the apparatus can also comprise several displays, wherein in this case the controller is configured to control the apparatus such that the information received from the external server is shown on the several displays and wherein the front wall comprises the several displays. Thus, the frame might enclose the several displays, wherein the controller preferentially comprises corresponding display connectors for connecting the displays. Additionally, the controller can be configured to receive first subinformation for a first display and second subinformation for a second display, wherein the first and second subinformation form the information to be shown on the two displays. The combination of the displays might be regarded as being a total display subdivided in subdisplays showing the subinformation forming the total information to be shown. The controller can also be configured to receive the information for displaying, to subdivide the received information into subinformation to be shown on the different displays and to finally provide the subinformation to the respective display.

Although in above described embodiments the display forms the front wall without a transparent plate in front of the display, in another embodiment the front wall can comprise the display and a transparent plate, wherein the transparent plate might be attached to the display such that the transparent plate forms the outside of the apparatus. There can also be a gap between the transparent plate and the display which might be filled with a glue.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

The control of the apparatus can be implemented as program code means of a computer program and/or as dedicated hardware. In particular, the controller of the apparatus can comprise corresponding program code means of a computer program and/or as dedicated hardware.

A computer program including computer instructions or logic may be stored/distributed on a suitable medium, such as a tangible, non-transitory optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention relates to an apparatus for displaying information on a vehicle. The apparatus comprises a display and a plate comprising a controller, a sensor and a communicator configured to communicate with an external server, wherein the controller is configured to control the apparatus such that sensor data from the sensor are sent to the external server and information received from the external server is shown on the display. A casing comprising a front wall includes the display, a back wall configured to be attached to the vehicle, and a frame, wherein the plate is arranged within the casing, wherein the frame comprises profile elements forming sidewalls of the casing and corner elements and wherein a respective corner element is detachably connected to two respective profile elements. This allows for a high adaptability of the apparatus.

All of the above U.S. patents, U.S. patent application publications, U.S. patent applications, foreign patents, foreign patent applications and non-patent publications referred to in this specification and/or listed in the Application Data Sheet are incorporated herein by reference in their entirety.

From the foregoing it will be appreciated that, although specific embodiments have been described herein for purposes of illustration, various modifications may be made without deviating from the spirit and scope of the invention. For example, the methods and apparatuses for performing displaying information on a vehicle discussed herein are applicable to other architectures. Also, the methods and systems discussed herein are applicable to differing protocols, communication media (optical, wireless, cable, etc.) and devices (such as wireless handsets, electronic organizers, personal digital assistants, portable email machines, game machines, pagers, navigation devices such as GPS receivers, etc.).

The invention claimed is:

1. An apparatus for displaying information on a vehicle, wherein the apparatus comprises:
a display configured to display the information;
a plate comprising a controller, a sensor and a communicator configured to communicate with an external server, wherein the controller is configured to control the apparatus such that sensor data from the sensor are sent to the external server and information received from the external server is shown on the display; and
a casing comprising a front wall which is directed away from the vehicle when the apparatus is attached to the vehicle, a back wall which is directed towards the vehicle when the apparatus is attached to the vehicle and a frame forming sidewalls of the casing, wherein the front wall comprises the display being surrounded by the frame on all sides of the display, wherein the back wall is configured to be attached to the vehicle and wherein the plate is arranged within the casing, wherein the frame comprises frame elements, wherein the frame elements include straight profile elements forming sidewalls of the casing and corner elements forming corners of the casing, wherein each of the corner elements is detachably connected to two of the straight profile elements of the frame, which form sidewalls of the casing, by means of connection elements, wherein the frame is attached to the display by using attachment elements and is structured such that a user is able to detach the frame from the display and to attach the frame to another display having different dimensions.

2. The apparatus of claim 1, wherein the sensor is attached to the plate by using an attachment element which is configured to allow a user to detach the sensor and to attach another sensor to the plate and wherein the sensor is connected to the controller via one of a plurality of sensor connectors of the controller, wherein the plurality of sensor connectors is configured to be connected to different types of sensors.

3. The apparatus of claim 1, wherein the frame is attached to the plate by using attachment elements which are configured to allow a user to detach the frame from the plate and to attach the plate to another frame and/or to attach the frame to another plate, wherein inner surfaces of the frame comprise grooves accommodating the attachment elements which are configured to fasten the plate to the frame.

4. The apparatus of claim 1, wherein the display is connected to the controller via one of a plurality of display connectors of the controller, wherein the plurality of display connectors is configured to be connected to different types of displays.

5. The apparatus of claim 1, wherein the apparatus comprises a further display configured to display the information, wherein the controller is configured to control the apparatus such that the information received from the external server is shown on the display and the further display, wherein the front wall comprises the display and the further display.

6. The apparatus of claim 1, wherein the front wall further comprises a transparent plate, wherein the transparent plate is attached to the display such that the transparent plate forms the outside of the apparatus, wherein there is a gap between the transparent plate and the display, which is filled with a glue.

7. The apparatus of claim 1, wherein the communicator is connected to the controller via one of a plurality of communicator connectors of the controller, wherein the plurality of communicator connectors is configured to be connected to different types of communicators.

8. The apparatus of claim 1, wherein the profile elements are identical.

9. The apparatus of claim 1, wherein the profile elements comprise attachment openings and the corner elements comprise further attachment openings, wherein the connection elements are screws guided through the attachment openings for detachably connecting the profile elements and the corner elements to each other, wherein a respective profile element comprises first and second elongated cavities along at least a part of the length of the respective profile element, wherein the second cavity comprises C-like structures forming the attachment openings of the respective profile element.

10. The apparatus of claim 9, wherein the back wall comprises attachment openings and the profile elements also comprise attachment openings from the outside of the profile elements to the first cavity, wherein connection elements are guided through the attachment openings for detachably connecting the back wall and the frame to each other.

11. The apparatus of claim 1, wherein a respective corner element comprises on a surface, which is directed towards a respective profile element, several guiding elements and the respective profile element comprises guiding structures, wherein the guiding elements and the guiding structures are formed such that the guiding structures accommodate the guiding elements if the respective corner element is arranged on the respective profile element in a predetermined position.

12. The apparatus of claim 1, wherein between a surface of a respective corner element, which is directed towards a respective profile element, and a surface of the respective profile element, which is directed towards the respective corner element, a respective sealing element is arranged.

13. The apparatus of claim 12, wherein each sealing element (25) provides a sealing with at least two sealing lines.

14. The apparatus of claim 12, wherein the corner elements further comprise spacers configured to ensure that the surface of the respective corner element and the surface of the respective profile element have a predetermined distance.

15. The apparatus of claim 1, wherein a respective corner element comprises a first surface directed towards a first profile element, a second surface directed towards a second profile element and parallel planar ribs, wherein the first and second surfaces are arranged with an angle of 90 degree relative to each other and wherein the ribs connect and are orthogonal to the first and second surfaces.

16. The apparatus of claim 15, wherein the respective corner element further comprises a cover attached to the ribs.

17. The apparatus of claim 1, wherein the plate is L-shaped.

18. The apparatus of claim 1, wherein the back wall comprises a metal part and a plastic part, wherein the back wall is planar and wherein the plastic part is arranged in an upper portion of the back wall, if the apparatus is attached to the vehicle.

19. The apparatus of claim 1, wherein the apparatus further comprises a storage unit configured to store information to be displayed, wherein the controller is configured to control the apparatus such that information which is stored in the storage unit is shown on the display, if information to be displayed is not received from the external server.

20. The apparatus of claim 1, wherein the apparatus further comprises a power distributor adapted to receive power from a power supply and adapted to distribute the power among the electrical components on the plate, wherein the power distributor is attached to the plate by using attachment elements which are configured to allow a user to detach the power distributor from the plate and to attach another power distributor to the plate, wherein the power distributor is adapted to stop distributing the power to the several electronic components if the received power falls below a predetermined threshold.

21. The apparatus of claim 1, wherein a camera is attached to the frame, wherein the camera is configured to acquire images of the environment of the apparatus and hence of the vehicle, if the apparatus is attached to the vehicle, wherein the camera is connected to the controller which is configured to process the images for generating image-related data and to control the apparatus such that the generated image-related data are sent to the external server.

22. The apparatus of claim 1, further comprising:
a server configured to receive sensor data from the apparatus and to send information to be displayed to the apparatus depending on the received sensor data.

23. A method for assembling an apparatus, the method comprising:
providing a kit configured for assembling an apparatus, the kit comprising a sensor, a communicator, a controller, a plate, a back wall, frame elements, and attachment elements;
connecting the sensor to a sensor connector of the controller and connecting the controller to the communicator and a display which is configured to display information such that sensor data from the sensor are sendable to an external server and information received from the external server is show-able on the display;
equipping the plate with the controller, the sensor and the communicator; and
forming a casing by using the back wall, the display and the frame elements such that a) the back wall is directable towards a vehicle when the apparatus is attached to the vehicle and forms a back side of the casing, b) the frame elements form a frame surrounding the display on all sides of the display, wherein the frame elements include straight profile elements forming sidewalls of the casing and corner elements forming corners of the casing, wherein each of the corner elements is detachably connected to two of the straight profile elements of the frame, which form sidewalls of the casing, c) a front wall of the casing comprises the display being surroi by the frame, d) the plate with the controller, the sensor and the communicator is within the casing, and e) the frame is attached to the display by using the attachment elements such that a user is able to detach the frame from the display and to attach the frame to another display having different dimensions.

* * * * *

UNITED STATES PATENT AND TRADEMARK OFFICE
CERTIFICATE OF CORRECTION

PATENT NO. : 12,202,502 B2  
APPLICATION NO. : 17/107794  
DATED : January 21, 2025  
INVENTOR(S) : Alexander Jablovski et al.

Page 1 of 1

It is certified that error appears in the above-identified patent and that said Letters Patent is hereby corrected as shown below:

In the Claims

Claim 23 Column 26, Line 22:
"display being surroi by the frame, d) the plate with the" should be "display being surrounded by the frame, d) the plate with the"

Signed and Sealed this
Fourth Day of March, 2025

Coke Morgan Stewart
*Acting Director of the United States Patent and Trademark Office*